(12) United States Patent
Johnson et al.

(10) Patent No.: US 11,280,261 B2
(45) Date of Patent: Mar. 22, 2022

(54) SYSTEMS FOR HHO GAS SECOND FUEL DISTRIBUTION AND CONTROL

(71) Applicant: HyTech Power, Inc., Redmond, WA (US)

(72) Inventors: Evan Charles Johnson, Lake Stevens, WA (US); Adam Anthony Filkins, Sandusky, MI (US); Herbert Daniel Deming, Clifford, MI (US); Henry White Dean, Sammamish, WA (US); Phillip Edward Jennings, Kirkland, WA (US)

(73) Assignee: HyTech Power, Inc., Redmond, WA (US)

( * ) Notice: Subject to any disclaimer, the term of this patent is extended or adjusted under 35 U.S.C. 154(b) by 0 days.

(21) Appl. No.: 16/031,827

(22) Filed: Jul. 10, 2018

(65) Prior Publication Data

US 2018/0320584 A1    Nov. 8, 2018

Related U.S. Application Data

(63) Continuation of application No. 15/451,266, filed on Mar. 6, 2017, now Pat. No. 10,605,162.
(Continued)

(51) Int. Cl.
*F02B 43/12*    (2006.01)
*F02M 21/02*    (2006.01)
(Continued)

(52) U.S. Cl.
CPC ............ *F02B 43/12* (2013.01); *C25B 1/04* (2013.01); *C25B 9/17* (2021.01); *C25B 11/00* (2013.01);
(Continued)

(58) Field of Classification Search
CPC .... C25B 1/04; C25B 1/06; C25B 9/06; C25B 15/08; F02M 21/02; F02M 21/0287; F02M 21/0239; F02M 25/12; F02M 35/10177; F02M 35/10216; F02M 35/10255; F02M 35/104; F01N 3/0293; Y02T 10/32; Y02E 60/366; F02B 43/12
(Continued)

(56) References Cited

U.S. PATENT DOCUMENTS 3,180,079 A   4/1965  Freeman
3,310,483 A   3/1967  Rhodes
(Continued)

FOREIGN PATENT DOCUMENTS

AR         103829      6/2017
AU       2009100335    5/2009
(Continued)

OTHER PUBLICATIONS

International Search Report dated Mar. 6, 2017 for PCT/US2017/020996.
(Continued)

*Primary Examiner* — John Kwon
*Assistant Examiner* — Johnny H Hoang
(74) *Attorney, Agent, or Firm* — Jones Day

(57) ABSTRACT

An HHO gas second fuel is produced in a pressure-resistant container and distributed at a low volumetric rate at multiple locations about the internal combustion engine.

22 Claims, 7 Drawing Sheets

Related U.S. Application Data

(60) Provisional application No. 62/304,935, filed on Mar. 7, 2016.

(51) Int. Cl.
| | |
|---|---|
| *F02M 35/104* | (2006.01) |
| *F02M 35/10* | (2006.01) |
| *C25B 15/08* | (2006.01) |
| *F02B 43/10* | (2006.01) |
| *C25B 1/04* | (2021.01) |
| *C25B 9/17* | (2021.01) |
| *C25B 11/00* | (2021.01) |
| *F02M 43/04* | (2006.01) |

(52) U.S. Cl.
CPC .............. *C25B 15/08* (2013.01); *F02B 43/10* (2013.01); *F02M 21/0221* (2013.01); *F02M 21/0239* (2013.01); *F02M 21/0248* (2013.01); *F02M 21/0287* (2013.01); *F02M 35/104* (2013.01); *F02M 35/10177* (2013.01); *F02M 35/10216* (2013.01); *F02M 35/10255* (2013.01); *F02M 43/04* (2013.01); *F02B 2043/106* (2013.01); *Y02E 60/36* (2013.01); *Y02T 10/30* (2013.01)

(58) Field of Classification Search
USPC .......................... 123/1–3; 204/241, 242, 252
See application file for complete search history.

(56) References Cited

U.S. PATENT DOCUMENTS

| | | | |
|---|---|---|---|
| 3,679,568 A | 7/1972 | Westerlund | |
| 3,799,124 A | 3/1974 | Swain | |
| 3,854,494 A | 12/1974 | Zahorsky | |
| 3,999,379 A | 12/1976 | LeFebvre | |
| 4,003,345 A | 1/1977 | Bradley | |
| 4,004,554 A | 1/1977 | Kosaka et al. | |
| 4,014,777 A | 3/1977 | Brown | |
| 4,023,545 A | 5/1977 | Mosher et al. | |
| 4,028,213 A | 6/1977 | Ford | |
| 4,031,865 A | 6/1977 | Dufour | |
| 4,033,133 A | 7/1977 | Houseman et al. | |
| 4,111,160 A | 9/1978 | Talenti | |
| 4,140,090 A | 2/1979 | Lindberg | |
| 4,203,818 A | 5/1980 | Greaves | |
| 4,209,303 A | 6/1980 | Ricks | |
| 4,271,793 A | 6/1981 | Valdespino | |
| 4,302,320 A | 11/1981 | Lewis | |
| 4,368,696 A | 1/1983 | Reinhardt | |
| 4,573,435 A | 3/1986 | Shelton | |
| 4,761,958 A | 8/1988 | Hellat | |
| 4,773,981 A | 9/1988 | Bidwell | |
| 5,012,945 A | 5/1991 | Keenan | |
| 5,119,768 A | 6/1992 | Russell | |
| 5,143,025 A | 9/1992 | Munday | |
| 5,231,954 A | 8/1993 | Stowe | |
| 5,272,871 A | 12/1993 | Oshima et al. | |
| 5,293,857 A | 3/1994 | Meyer | |
| 5,305,715 A | 4/1994 | Nissley | |
| 5,452,688 A | 9/1995 | Rose | |
| 5,458,095 A | 10/1995 | Post et al. | |
| 5,484,512 A | 1/1996 | Sasaki et al. | |
| 5,634,341 A | 6/1997 | Hughes et al. | |
| 5,858,185 A | 1/1999 | Christian | |
| 6,311,648 B1 | 11/2001 | Larocque | |
| 6,332,434 B1 | 12/2001 | De et al. | |
| 6,336,430 B2* | 1/2002 | de Souza | C25B 9/06 |
| | | | 123/3 |
| 6,606,856 B1 | 8/2003 | Langer et al. | |
| 6,725,653 B2 | 4/2004 | Tadrous et al. | |
| 6,742,507 B2 | 6/2004 | Keefer et al. | |
| 6,833,206 B2 | 12/2004 | Richters et al. | |
| 6,895,945 B2 | 5/2005 | Parsa | |
| 6,955,052 B2 | 10/2005 | Primlani | |
| 7,100,542 B2 | 9/2006 | Ehresman | |
| 7,117,830 B1 | 10/2006 | Boyer et al. | |
| 7,258,779 B2 | 8/2007 | Casey et al. | |
| 7,273,044 B2 | 9/2007 | Flessner et al. | |
| 7,290,504 B2 | 11/2007 | Lange et al. | |
| 7,357,102 B1 | 4/2008 | Lin et al. | |
| 7,401,578 B2 | 7/2008 | Lindsey et al. | |
| 7,430,991 B2 | 10/2008 | Vanhoose et al. | |
| 7,475,656 B2 | 1/2009 | Yatsenko | |
| 7,585,338 B2* | 9/2009 | Yoshizaki | B01J 16/005 |
| | | | 123/3 |
| 7,621,260 B2 | 11/2009 | Mitani et al. | |
| 7,654,233 B2 | 2/2010 | Lin | |
| 7,789,047 B2 | 9/2010 | Shinagawa et al. | |
| 7,861,696 B2 | 1/2011 | Lund | |
| 8,118,012 B2 | 2/2012 | Shinagawa et al. | |
| 8,127,750 B2 | 3/2012 | Dica et al. | |
| 8,141,523 B2 | 3/2012 | Gammons et al. | |
| 8,161,748 B2 | 4/2012 | Haase | |
| 8,168,047 B1 | 5/2012 | Smith | |
| 8,186,315 B2 | 5/2012 | Barlow et al. | |
| 8,236,149 B2 | 8/2012 | Wilson | |
| 8,303,798 B2 | 11/2012 | Dees et al. | |
| 8,449,733 B2 | 5/2013 | Owens | |
| 8,449,737 B2 | 5/2013 | Richardson | |
| 8,464,667 B1 | 6/2013 | Stama | |
| 8,544,452 B1 | 10/2013 | Galvin et al. | |
| 8,709,221 B1 | 4/2014 | Smith | |
| 8,714,115 B2 | 5/2014 | Mcconahay et al. | |
| 8,720,390 B2 | 5/2014 | Lee | |
| 8,808,528 B2 | 8/2014 | Richardson | |
| 8,827,016 B2 | 9/2014 | Viengchai | |
| 8,869,755 B2 | 10/2014 | Shmueli et al. | |
| 8,912,748 B2 | 12/2014 | Hiebl et al. | |
| 8,955,469 B2 | 2/2015 | McConahay et al. | |
| 8,984,881 B1 | 3/2015 | Stanton | |
| 9,027,342 B2 | 5/2015 | Foy et al. | |
| 9,051,872 B2 | 6/2015 | Monros | |
| 9,140,181 B2 | 9/2015 | Turgeon et al. | |
| 9,157,159 B2 | 10/2015 | Hansen | |
| 9,194,583 B2 | 11/2015 | De la Sovera | |
| 9,212,634 B2 | 12/2015 | Adair | |
| 9,249,369 B2 | 2/2016 | Wey | |
| 9,267,428 B2 | 2/2016 | Riesselman et al. | |
| 9,291,129 B2 | 3/2016 | Robinson | |
| 9,340,881 B2 | 5/2016 | Packer | |
| 9,353,451 B2 | 5/2016 | Haywood | |
| 9,388,749 B2 | 7/2016 | MacDonald | |
| 9,404,449 B2 | 8/2016 | Licitar | |
| 9,440,851 B2 | 9/2016 | Hwang | |
| 9,464,553 B2 | 10/2016 | Wold | |
| 9,499,452 B2 | 11/2016 | Courtright | |
| 9,562,295 B2 | 2/2017 | McDugle | |
| 9,611,553 B2 | 4/2017 | Pavlovic et al. | |
| 9,695,757 B2 | 7/2017 | Mcmahon | |
| 9,733,155 B2 | 8/2017 | Monros | |
| 9,765,713 B2* | 9/2017 | Kou | F02D 19/0644 |
| 9,771,658 B2 | 9/2017 | Haring | |
| 9,863,309 B2 | 1/2018 | Salter | |
| 9,920,714 B2 | 3/2018 | Kim et al. | |
| 2001/0003276 A1 | 6/2001 | De Souza et al. | |
| 2003/0159663 A1 | 8/2003 | Zagaja et al. | |
| 2003/0183179 A1 | 10/2003 | Lin | |
| 2003/0205482 A1 | 11/2003 | Allen | |
| 2004/0040838 A1 | 3/2004 | Helmke et al. | |
| 2004/0101795 A1 | 5/2004 | Fairfull | |
| 2004/0131902 A1 | 7/2004 | Frank et al. | |
| 2004/0149591 A1 | 8/2004 | Klein et al. | |
| 2005/0217991 A1 | 10/2005 | Dahlquist | |
| 2005/0229872 A1* | 10/2005 | Lange | C01B 3/323 |
| | | | 123/3 |
| 2006/0081290 A1 | 4/2006 | Sachs | |
| 2006/0179819 A1 | 8/2006 | Sullivan | |
| 2007/0080071 A1 | 4/2007 | Perry | |
| 2007/0215070 A1 | 9/2007 | Yatsenko | |
| 2007/0246351 A1 | 10/2007 | Smola et al. | |
| 2008/0006743 A1 | 1/2008 | Miller et al. | |

(56) References Cited

U.S. PATENT DOCUMENTS

| | | |
|---|---|---|
| 2008/0022982 A1 | 1/2008 | Kamiyama |
| 2008/0038478 A1 | 2/2008 | Klein |
| 2008/0047830 A1* | 2/2008 | Fairfull .................. C25B 1/06 204/276 |
| 2008/0110421 A1 | 5/2008 | Flessner et al. |
| 2009/0194421 A1 | 8/2009 | Sato et al. |
| 2009/0199465 A1 | 8/2009 | Klein et al. |
| 2009/0283402 A1 | 11/2009 | Osman |
| 2009/0283420 A1 | 11/2009 | Schadeck et al. |
| 2010/0032221 A1 | 2/2010 | Storey |
| 2010/0038236 A1 | 2/2010 | Rivera |
| 2010/0038257 A1 | 2/2010 | Sohn |
| 2010/0049417 A1 | 2/2010 | Bailey et al. |
| 2010/0077756 A1 | 4/2010 | Poyyapakkam et al. |
| 2010/0132634 A1 | 6/2010 | Selano |
| 2010/0132661 A1 | 6/2010 | Klein et al. |
| 2010/0139597 A1 | 6/2010 | Wisdom et al. |
| 2010/0147231 A1 | 6/2010 | Bogers et al. |
| 2010/0147232 A1 | 6/2010 | Heath et al. |
| 2010/0155233 A1 | 6/2010 | Hwang |
| 2010/0206721 A1 | 8/2010 | Snidvongs |
| 2010/0229839 A1 | 9/2010 | Fornarelli |
| 2010/0252421 A1 | 10/2010 | Yang |
| 2010/0263379 A1 | 10/2010 | Berkyto |
| 2010/0275859 A1 | 11/2010 | Klotz |
| 2010/0300381 A1* | 12/2010 | Harper .................. C25B 1/08 123/3 |
| 2010/0320083 A1 | 12/2010 | Seratt et al. |
| 2011/0005939 A1 | 1/2011 | Haywood |
| 2011/0030625 A1 | 2/2011 | Hammer et al. |
| 2011/0061957 A1 | 3/2011 | Hargett |
| 2011/0067652 A1 | 3/2011 | Bishop |
| 2011/0089029 A1 | 4/2011 | Volk, Jr. |
| 2011/0100803 A1 | 5/2011 | Dee et al. |
| 2011/0108000 A1 | 5/2011 | Williams et al. |
| 2011/0174242 A1 | 7/2011 | McConahay et al. |
| 2011/0174277 A1 | 7/2011 | Socolove |
| 2011/0180416 A1 | 7/2011 | Kurashina et al. |
| 2011/0191008 A1 | 8/2011 | Mcconahay et al. |
| 2011/0203917 A1 | 8/2011 | Shmueli |
| 2011/0207007 A1 | 8/2011 | Ab et al. |
| 2011/0209993 A1 | 9/2011 | Barmichael |
| 2011/0220039 A1 | 9/2011 | Nowicki et al. |
| 2011/0253070 A1 | 10/2011 | Haring |
| 2011/0274615 A1 | 11/2011 | Ishikawa |
| 2011/0303194 A1 | 12/2011 | Fong et al. |
| 2012/0037510 A1 | 2/2012 | Bethurem |
| 2012/0067304 A1 | 3/2012 | Littmann |
| 2012/0091010 A1 | 4/2012 | Van et al. |
| 2012/0111290 A1* | 5/2012 | McBride .................. C01B 3/50 123/3 |
| 2012/0111734 A1 | 5/2012 | Kramer |
| 2012/0118727 A1 | 5/2012 | McDugle |
| 2012/0144982 A1 | 6/2012 | Ohlson |
| 2012/0181168 A1 | 7/2012 | Gargiuolo et al. |
| 2012/0186991 A1 | 7/2012 | Gootblatt |
| 2012/0199472 A1* | 8/2012 | Curfew .................. C25B 1/04 204/241 |
| 2012/0216759 A1 | 8/2012 | Irvin |
| 2012/0217155 A1* | 8/2012 | Woodward ............. C25B 1/04 204/242 |
| 2012/0234265 A1 | 9/2012 | Ball et al. |
| 2012/0282534 A1* | 11/2012 | Braun .................. H01M 8/1213 204/274 |
| 2012/0298054 A1 | 11/2012 | Dinsmore |
| 2013/0037003 A1 | 2/2013 | Sheerin |
| 2013/0061822 A1 | 3/2013 | Adair |
| 2013/0125454 A1 | 5/2013 | Lewis et al. |
| 2013/0133595 A1 | 5/2013 | Chen |
| 2013/0174930 A1 | 7/2013 | Arroyo et al. |
| 2013/0247867 A1 | 9/2013 | Shmueli et al. |
| 2013/0312384 A1 | 11/2013 | Hwang |
| 2013/0327286 A1 | 12/2013 | Ito |
| 2014/0014049 A1 | 1/2014 | Watson et al. |
| 2014/0090986 A1 | 4/2014 | Bethurem |
| 2014/0096727 A1 | 4/2014 | Ortenheim et al. |
| 2014/0096728 A1* | 4/2014 | Ortenheim ............. C25B 9/04 123/3 |
| 2014/0202877 A1 | 7/2014 | Greenbaum |
| 2014/0245974 A1 | 9/2014 | Elsarrag et al. |
| 2014/0261253 A1 | 9/2014 | Wold |
| 2014/0262757 A1 | 9/2014 | Forbes |
| 2014/0379237 A1 | 12/2014 | Rodriguez |
| 2015/0040843 A1 | 2/2015 | Goldman et al. |
| 2015/0040844 A1 | 2/2015 | Goldman et al. |
| 2015/0101926 A1* | 4/2015 | Burns .................. C25B 9/06 204/277 |
| 2015/0122237 A1 | 5/2015 | Kato |
| 2015/0167180 A1 | 6/2015 | Maddox |
| 2015/0226113 A1 | 8/2015 | Alexander et al. |
| 2015/0292380 A1 | 10/2015 | Ballinger et al. |
| 2016/0047284 A1 | 2/2016 | Turgeon et al. |
| 2016/0084157 A1 | 3/2016 | Hudson |
| 2016/0131024 A1 | 5/2016 | Tsurumi |
| 2016/0145521 A1 | 5/2016 | Omasa |
| 2016/0153355 A1 | 6/2016 | Wylie et al. |
| 2016/0333487 A1 | 11/2016 | Delgado et al. |
| 2017/0037815 A1 | 2/2017 | Lowe et al. |
| 2017/0159618 A1 | 6/2017 | Forbes et al. |
| 2017/0211192 A1 | 7/2017 | Bozhilov et al. |
| 2017/0211516 A1 | 7/2017 | Monros |
| 2017/0254259 A1* | 9/2017 | Johnson ............. F02M 21/0221 |
| 2017/0260633 A1 | 9/2017 | Gui |
| 2018/0038318 A1 | 2/2018 | Ross |
| 2018/0058387 A1 | 3/2018 | De Meneses et al. |
| 2018/0087464 A1 | 3/2018 | Sekita |
| 2018/0112608 A1 | 4/2018 | Bridge et al. |
| 2018/0298813 A1 | 10/2018 | Manthei et al. |
| 2018/0328297 A1 | 11/2018 | Ueno et al. |

FOREIGN PATENT DOCUMENTS

| | | |
|---|---|---|
| BR | PI0705471 | 8/2009 |
| BR | PI0901304 | 1/2011 |
| BR | 102013014876 | 7/2015 |
| BR | 102014019810 | 7/2016 |
| CA | 1171672 | 7/1984 |
| CA | 1301372 | 5/1992 |
| CA | 2349508 | 12/2002 |
| CA | 2612955 | 7/2009 |
| CA | 2805756 | 8/2014 |
| CA | 2957058 | 8/2017 |
| CL | 2016002237 | 4/2017 |
| CN | 2339767 | 9/1999 |
| CN | 2913645 | 6/2007 |
| CN | 2921326 | 7/2007 |
| CN | 200955439 | 10/2007 |
| CN | 201002518 | 1/2008 |
| CN | 201083166 | 7/2008 |
| CN | 201201974 | 3/2009 |
| CN | 201201975 | 3/2009 |
| CN | 101403354 | 4/2009 |
| CN | 101481803 | 7/2009 |
| CN | 201273231 | 7/2009 |
| CN | 201287625 | 8/2009 |
| CN | 201318230 | 9/2009 |
| CN | 201339523 | 11/2009 |
| CN | 201351176 | 11/2009 |
| CN | 201351177 | 11/2009 |
| CN | 201362743 | 12/2009 |
| CN | 101633311 | 1/2010 |
| CN | 201461149 | 5/2010 |
| CN | 101746251 | 6/2010 |
| CN | 101907047 | 12/2010 |
| CN | 101915186 | 12/2010 |
| CN | 201661391 | 12/2010 |
| CN | 201665713 | 12/2010 |
| CN | 201704415 | 1/2011 |
| CN | 101975108 | 2/2011 |
| CN | 201786493 | 4/2011 |
| CN | 102052196 | 5/2011 |
| CN | 201980231 | 9/2011 |
| CN | 202031730 | 11/2011 |

(56) References Cited

FOREIGN PATENT DOCUMENTS

| | | |
|---|---|---|
| CN | 202047909 | 11/2011 |
| CN | 202202992 | 4/2012 |
| CN | 202220682 | 5/2012 |
| CN | 102913348 | 2/2013 |
| CN | 102925918 | 2/2013 |
| CN | 103233830 | 8/2013 |
| CN | 103362697 | 10/2013 |
| CN | 203285571 | 11/2013 |
| CN | 203307438 | 11/2013 |
| CN | 103437918 | 12/2013 |
| CN | 203499858 | 3/2014 |
| CN | 203499862 | 3/2014 |
| CN | 203515863 | 4/2014 |
| CN | 203570462 | 4/2014 |
| CN | 10 3789792 | 5/2014 |
| CN | 103789785 | 5/2014 |
| CN | 103867352 | 6/2014 |
| CN | 103982337 | 8/2014 |
| CN | 203796402 | 8/2014 |
| CN | 203835574 | 9/2014 |
| CN | 203960354 | 11/2014 |
| CN | 104179603 | 12/2014 |
| CN | 104348240 | 2/2015 |
| CN | 104348241 | 2/2015 |
| CN | 104373258 | 2/2015 |
| CN | 204163890 | 2/2015 |
| CN | 204371523 | 6/2015 |
| CN | 104819074 | 8/2015 |
| CN | 104819075 | 8/2015 |
| CN | 204661832 | 9/2015 |
| CN | 105003364 | 10/2015 |
| CN | 105020061 | 11/2015 |
| CN | 105020062 | 11/2015 |
| CN | 105065144 | 11/2015 |
| CN | 105114219 | 12/2015 |
| CN | 105201694 | 12/2015 |
| CN | 105201695 | 12/2015 |
| CN | 204877725 | 12/2015 |
| CN | 204921202 | 12/2015 |
| CN | 105240165 | 1/2016 |
| CN | 204984594 | 1/2016 |
| CN | 204984650 | 1/2016 |
| CN | 204984651 | 1/2016 |
| CN | 205062195 | 3/2016 |
| CN | 205099760 | 3/2016 |
| CN | 205172761 | 4/2016 |
| CN | 205220331 | 5/2016 |
| CN | 205295479 | 6/2016 |
| CN | 205389196 | 7/2016 |
| CN | 205477989 | 8/2016 |
| CN | 205578140 | 9/2016 |
| CN | 205590289 | 9/2016 |
| CN | 106089430 | 11/2016 |
| CN | 106121871 | 11/2016 |
| CN | 205895436 | 1/2017 |
| CN | 106757121 | 5/2017 |
| CN | 107099812 | 8/2017 |
| CN | 206368738 | 8/2017 |
| CN | 107178443 | 9/2017 |
| CN | 206843594 | 1/2018 |
| CN | 206874392 | 1/2018 |
| CN | 206874393 | 1/2018 |
| CN | 206942887 | 1/2018 |
| CN | 206942888 | 1/2018 |
| CZ | 20140017 | 7/2015 |
| DE | 4434149 | 3/1996 |
| DE | 19540993 | 7/1997 |
| DE | 202008012040 | 11/2008 |
| DE | 202009004477 | 8/2009 |
| DE | 102008046647 | 3/2010 |
| DE | 102008053211 | 4/2010 |
| DE | 202009010704 | 9/2010 |
| DE | 102009044144 | 4/2011 |
| DE | 102009050872 | 4/2011 |
| DE | 202011107770 | 3/2012 |
| DE | 102011000126 | 7/2012 |
| DE | 102012006827 | 6/2013 |
| DE | 102012006086 | 9/2013 |
| DE | 102012017930 | 3/2014 |
| DE | 102014012093 | 2/2016 |
| DE | 102014017092 | 5/2016 |
| DE | 102017107122 | 10/2017 |
| DK | 201000099 | 8/2010 |
| EP | 1227240 | 7/2002 |
| EP | 2604838 | 11/2013 |
| EP | 2876290 | 5/2015 |
| EP | 3124780 | 9/2017 |
| ES | 134965 | 8/1934 |
| ES | 1068178 | 9/2008 |
| ES | 2568514 | 4/2016 |
| ES | 2641052 | 11/2017 |
| ES | 2645315 | 12/2017 |
| FR | 3010237 | 3/2015 |
| GB | 487519 | 6/1938 |
| GB | 496120 | 11/1938 |
| GB | 200802884 | 3/2008 |
| GB | 200900319 | 2/2009 |
| GB | 201113786 | 9/2011 |
| GB | 201311736 | 8/2013 |
| GB | 2510380 | 8/2014 |
| GB | 201511429 | 8/2015 |
| GB | 201511431 | 8/2015 |
| GB | 201511432 | 8/2015 |
| GB | 201602690 | 3/2016 |
| GB | 2540810 | 2/2017 |
| GB | 2539904 | 4/2017 |
| GB | 2539905 | 4/2017 |
| GB | 2539906 | 4/2017 |
| GR | 1008084 | 1/2014 |
| IE | 20150359 | 3/2017 |
| IN | 01686MU2008 | 9/2008 |
| IN | 00603KO2009 | 5/2009 |
| IN | 03119CH2008 | 2/2010 |
| IN | 02621MU2009 | 3/2010 |
| IN | 02071DE2008 | 4/2010 |
| IN | 00039DE2010 | 7/2011 |
| IN | 02927CH2012 | 8/2012 |
| IN | 00382MU2013 | 4/2013 |
| IN | 01771MU2013 | 5/2013 |
| IN | 02434MU2013 | 8/2013 |
| IN | 00054CH2011 | 3/2014 |
| IN | 00112DE2012 | 5/2015 |
| IN | 01144CH2014 | 9/2015 |
| IN | 04021CH2015 | 9/2015 |
| IN | 02694CH2014 | 1/2016 |
| IN | 07113CH2015 | 1/2016 |
| IN | 00660MU2014 | 3/2016 |
| IN | 05235CH2012 | 5/2016 |
| IN | 01186CH2014 | 7/2016 |
| IN | 00460DE2009 | 8/2016 |
| IN | 02271CH2015 | 11/2016 |
| IN | 04374CH2015 | 2/2017 |
| IN | 201641010976 | 10/2017 |
| JP | 10266900 | 10/1998 |
| JP | 2001-003818 | 1/2001 |
| JP | 2008051065 | 3/2008 |
| JP | 2008051066 | 3/2008 |
| JP | 2008051068 | 3/2008 |
| JP | 2008057441 | 3/2008 |
| JP | 3146521 | 11/2008 |
| JP | 2008274378 | 11/2008 |
| JP | 2012031488 | 2/2012 |
| JP | 2012122092 | 6/2012 |
| JP | 2012122383 | 6/2012 |
| JP | 2013142154 | 7/2013 |
| JP | 2013160048 | 8/2013 |
| JP | 2014129805 | 7/2014 |
| JP | 2018031067 | 3/2018 |
| JP | 2018044549 | 3/2018 |
| KR | 200281423 | 7/2002 |
| KR | 200322395 | 8/2003 |
| KR | 200341072 | 2/2004 |
| KR | 20080007029 | 1/2008 |
| KR | 2010-0105108 | 9/2010 |

(56) References Cited

FOREIGN PATENT DOCUMENTS

| | | |
|---|---|---|
| KR | 2011-0119055 | 11/2011 |
| KR | 20110119055 | 11/2011 |
| KR | 20120011368 | 2/2012 |
| KR | 20120019023 | 3/2012 |
| KR | 20120053813 | 5/2012 |
| KR | 20120056495 | 6/2012 |
| KR | 101177851 | 8/2012 |
| KR | 101186289 | 9/2012 |
| KR | 101186290 | 9/2012 |
| KR | 101206023 | 11/2012 |
| KR | 101239981 | 3/2013 |
| KR | 101239983 | 3/2013 |
| KR | 101246899 | 3/2013 |
| KR | 101246900 | 3/2013 |
| KR | 101246901 | 3/2013 |
| KR | 101246902 | 3/2013 |
| KR | 20130026943 | 3/2013 |
| KR | 101261861 | 5/2013 |
| KR | 20140035192 | 3/2014 |
| KR | 101414780 | 7/2014 |
| KR | 101420105 | 7/2014 |
| KR | 101456291 | 11/2014 |
| KR | 20150090700 | 8/2015 |
| KR | 20160030905 | 3/2016 |
| KR | 101683744 | 12/2016 |
| KR | 101710177 | 2/2017 |
| KR | 20170056792 | 5/2017 |
| KR | 20170056793 | 5/2017 |
| KR | 101752292 | 7/2017 |
| KR | 20170087818 | 7/2017 |
| KR | 20180012395 | 2/2018 |
| MX | 2016012771 | 2/2017 |
| MX | 2017007770 | 10/2017 |
| MY | 143727 | 6/2011 |
| MY | 146682 | 9/2012 |
| PE | 08442015 | 6/2015 |
| PH | 2014000130 | 11/2015 |
| PL | 398981 | 10/2013 |
| PL | 406024 | 5/2015 |
| TN | 2010000312 | 12/2011 |
| TR | 201705088 | 7/2017 |
| TW | M296307 | 8/2006 |
| TW | M313170 | 6/2007 |
| TW | M353851 | 4/2009 |
| TW | 200949159 | 12/2009 |
| TW | 201006695 | 2/2010 |
| TW | 201008802 | 3/2010 |
| TW | M377554 | 4/2010 |
| TW | M378282 | 4/2010 |
| TW | 201102487 | 1/2011 |
| TW | M424257 | 3/2012 |
| TW | M433982 | 7/2012 |
| TW | M539454 | 4/2017 |
| UA | 49272 | 4/2010 |
| WO | WO 1992008885 | 5/1992 |
| WO | WO 2006/037006 | 4/2006 |
| WO | WO 2007047182 | 4/2007 |
| WO | WO 2008012632 | 1/2008 |
| WO | WO 2008118088 | 10/2008 |
| WO | WO 2010002308 | 1/2010 |
| WO | WO 2010069275 | 6/2010 |
| WO | WO 2011016792 | 2/2011 |
| WO | WO 2011023865 | 3/2011 |
| WO | WO 2011030556 | 3/2011 |
| WO | WO 2011103925 | 9/2011 |
| WO | WO 2011124872 | 10/2011 |
| WO | WO 2011125064 | 10/2011 |
| WO | WO 2011160176 | 12/2011 |
| WO | WO 2012049689 | 4/2012 |
| WO | WO 2013057677 | 4/2013 |
| WO | WO 2013070096 | 5/2013 |
| WO | WO 2013159755 | 10/2013 |
| WO | WO 2014007802 | 1/2014 |
| WO | WO 2014025249 | 2/2014 |
| WO | WO 2014028951 | 2/2014 |
| WO | WO 2014091094 | 6/2014 |
| WO | WO 2014108732 | 7/2014 |
| WO | WO 2014145955 | 9/2014 |
| WO | WO 2015001288 | 1/2015 |
| WO | WO 2015033030 | 3/2015 |
| WO | WO 2015075566 | 5/2015 |
| WO | WO 2015079316 | 6/2015 |
| WO | WO 2015080676 | 6/2015 |
| WO | WO 2015084192 | 6/2015 |
| WO | WO 2015104556 | 7/2015 |
| WO | WO 2016001654 | 1/2016 |
| WO | WO 2016026539 | 2/2016 |
| WO | WO 2016105188 | 6/2016 |
| WO | WO 2016109950 | 7/2016 |
| WO | WO 2016110685 | 7/2016 |
| WO | WO 2016125717 | 8/2016 |
| WO | WO 2017018574 | 2/2017 |
| WO | WO 2017031632 | 3/2017 |
| WO | WO 2017039464 | 3/2017 |
| WO | WO 2017088858 | 6/2017 |
| WO | WO 2017091880 | 6/2017 |
| WO | WO 2017107253 | 6/2017 |
| WO | WO 2017109446 | 6/2017 |
| WO | WO 2017205681 | 11/2017 |
| WO | WO 2018000595 | 1/2018 |
| WO | WO 2018000596 | 1/2018 |
| WO | WO 2018000597 | 1/2018 |
| WO | WO 2018044184 | 3/2018 |
| WO | WO 2018072772 | 4/2018 |
| WO | WO 2018085464 | 5/2018 |

OTHER PUBLICATIONS

Written Opinion of the International Search Authority dated Jul. 14, 2017 for PCT/US2017/020996.
Office Action dated Oct. 29, 2018 in U.S. Appl. No. 16/101,178.
Office Action dated Oct. 30, 2018 in U.S. Appl. No. 15/451,266.
U.S. Department of Transportation, "Guidelines for Use of Hydrogen Fuel in Commercial Vehicles", Final Report, Nov. 2007, 94 pages.
Diseal Powwer, "Hydrogen Fuel—Is It For You?", Exploring The Diesel-Hydrogen Hybrid Possibilities, Feb. 2009, 5 pages.
Idrocell.com, "Overview—Liquid Electrolyte Cells", Dec. 7, 2012, 3 pages.
hho2u.com, "HHO Technical Stuff and HHO Generator install Help—HHO Videos", HHO Dry Cell, Hydrogen on Demand Systems and HHO Generators, Dec. 7, 2012, 5 pages.
Wikipedia.org, "Fuel Cell", Dec. 7, 2012, pp. 1-15.
Wikipedia.org, "Electrolytic Cell", Dec. 7, 2012, 3 pages.
Wikipedia.org, "BMW Hydrogen 7", Dec. 7, 2012, 4 pages.
Myskunkworks.net, "Tunable 60 Amp PWM Hydrogen Cell HHO Generator Control", Dec. 7, 2012, pp. 1-3.
hho4free.com, Jan. 29, 2013, 43 pages.
Apolo HHO System website, "HHO System—Run Your Car on Water (Hydroxy Gas)", Dec. 10, 2012, 9 pages.
Fuel from $H_2O$ website (www.fuelfromh2o.com) homepage and hydrogen generator product/technology overview (5 pages) Sep. 18, 2014.
Roberts, D., "This company may have solved one of the hardest problems in clean energy", Feb. 16, 2018, https://www.vox.com/energy-and-environment/2018/2/16/16926950/hydrogen-fuel-technology-economy-hytech-storage.
El-Kassaby, M., "Effect of hydroxyl (HHO) gas addition on gasoline engine perfomance and emissions", *Alexandria Engineering J*, 55 (2016) 243-251.
hho4free.com LPM / Water Usage Calculator, Jan. 1, 2016, 2 pages.
dynaCERT, "Driving Change for a Better Future—The Hydragen™ Technology", Nov. 29, 2017, https://fs.go.iopw.com/FileServer/sites/169/home-releases/THIS%20IS%20DYNACERT_29.11.2017.pdf.
"Systems and Methods for Safely Generating and Distributing Ultra Low Quantity of HHO Gas yo an Internal Combustion Engine", Anaqua (May 10, 2018) 19 pages.
"Method for Generating and Distributing a Second Fuel for an Internal Combustion Engine", Anagua (May 10, 2018) 22 pages.

(56) References Cited

OTHER PUBLICATIONS

Bose, D. et al., "Renewable Electrolysis using Graphene electrodes for Solar water splitting", *Int'l J. ChemTech Res.* 10(4) (2017) 103-114.
Non-Final Office Action in U.S. Appl. No. 16/101,207 dated Nov. 30, 2018.
Non-Final Office Action in U.S. Appl. No. 16/101,223 dated Nov. 29, 2018.
Office Action in Korean Patent Appln. No. 2014-7027476 dated Nov. 19, 2018.
Non-Final Office Action in U.S. Appl. No. 16/101,156 dated Dec. 11, 2018.
Final Office Action in U.S. Appl. No. 16/101,178 dated Jan. 25, 2019.
Non-Final Office Action in U.S. Appl. No. 16/101,084 dated Jan. 30, 2019.
Non-Final Office Action in U.S. Appl. No. 16/101,137 dated Feb. 25, 2019.

\* cited by examiner

SYSTEMS FOR HHO GAS SECOND FUEL DISTRIBUTION AND CONTROL

CROSS-REFERENCE TO RELATED APPLICATIONS

This application is a continuation of U.S. patent application Ser. No. 15/451,266, filed Mar. 6, 2017, and which further claims the benefit of U.S. Provisional Application No. 62/304,935, filed Mar. 7, 2016. The foregoing related applications, in their entirety, are incorporated herein by reference.

FIELD OF THE INVENTION

This disclosure relates to systems and methods for generating HHO gas (a gas resulting from electrolysis of an aqueous electrolyte solution) and for distributing and delivering the same about internal combustion engines. In particular, the systems and methods of this disclosure relate to second fuel (the HHO gas) injected in proximity to the engine intake valve or valves. In certain embodiments, for example, the injection system for the second fuel may comprise a multi-point, variable injection system. In certain embodiments, for example, the internal combustion engine may be a spark ignition engine or a compression ignition engine.

BACKGROUND OF THE INVENTION

Worldwide emissions, stemming primarily from the burning of fossil fuels, are reaching the highest levels ever recorded. By some measures, the emissions associated with burning fossil fuels have already reached nearly 5 metric tons/person/year. Internal combustion engines, including diesel engines, are a major contributor of fossil fuel emissions. In fact, by some measures, there are over 300 million diesel engines worldwide.

Internal combustion engines, and diesel engines in particular, emit particulate matter (PM) and governments around the world are realizing that these emissions are a cause for great concern. As a result, many countries/jurisdictions, including the United States, the European Union and China, are passing regulations which require significantly reduced emissions from internal combustion engines, including diesel engines.

Accordingly, more and more, businesses are forced to comply with these new air quality standards at their own expense. Sometimes, the costs for modifying large fleets of vehicles to meet new regulations can exceed US $30,000 per vehicle.

An attributable amount of emissions created by internal combustion engines is a result of the internal combustion engines failure to convert all of the energy available in the hydrocarbon fuel (e.g., gasoline and/or diesel fuel). This incomplete conversion is often a result of what is commonly referred to as incomplete combustion of the fuel. Incomplete combustion results in an unnecessary loss of fuel efficiency and an increase in pollution.

Accordingly, it is desirable to have a system and/or method for use with an internal combustion engine, that aids in achieving more complete combustion of the hydrocarbon fuel, reduced emissions, and/or better fuel economy, or otherwise improves certain metrics of the internal combustion engine.

BRIEF SUMMARY OF THE INVENTION

Certain embodiments may provide, for example, an electrolysis cell comprising: a pressure-resistant container comprising a first defined space for holding an electrolyte solution, a plurality of electrolysis plates (also referred to as electrode plates) retained within the first defined space, and a second defined space for holding a gas. In certain embodiments, for example, the volume of the second defined space may be equal to or greater than (for example the same as) the volume of the first defined space. In certain embodiments, for example, the volume of the second defined space may be equal to or slightly less (for example, at least 35%) of the volume of the first defined space. In certain embodiments, for example steady state applications, the volume of the second defined space may be a fraction (for example, less than 15%) of the volume of the first defined space. In certain embodiments, one or more than one (including for instance all) of the following embodiments may comprise each of the other embodiments or parts thereof. In certain embodiments, for example, the pressure-resistant container may be capable of maintaining a pressure in excess of 100 psi (for example in excess of 150 psi or in excess of 200 psi). In certain embodiments, for example, the electrolysis cell may further comprise a pressure relief valve configured to open when a pressure of gas inside the container exceeds 80 psi (for example when the pressure of the gas exceeds 125 psi or in excess of 150 psi).

In certain embodiments, for example, the pressure-resistant container may further comprise a positive terminal, a negative terminal, a gas outlet, electrolyte solution fill port and/or a drain port and optionally sensor, switch and/or safety device ports. In certain embodiments, for example, the positive terminal may be connected to at least one of the plurality of electrolysis plates, and the negative terminal may be connected to at least another one (or at least one plate different than any of the at least one plates that the positive terminal is connected to) of the plurality of electrolysis plates. In certain embodiments, for example, the positive terminal may provide an electrical connection to one of the plurality of plates from a connection point outside the container. In certain embodiments, for example, the negative terminal may provide an electrical connection to one of the plurality of plates from a connection point outside the container. In certain embodiments, for example, the positive terminal and the negative terminal may be in electrical and/or electrochemical communication predominately (for example, greater than 85%, greater than 90%, greater than 95%, or greater than 98% of the current flowing between the terminals) flows through the plurality of plates. In certain embodiments, for example, the plurality of plates may be configured as a stack of approximately parallel plates in fixed relation comprising two end plates and remaining plates spaced an approximately equal distance between adjacent plates. In certain further embodiments, for example, the positive terminal may be attached to one of the end plates and the negative terminal may be attached to the other of the end plates. In certain further embodiments, for example, the positive terminal may be attached to at least one interior plate and the negative terminal may be attached to at least one or two exterior plates, and vice versa. In certain further embodiments, for example, the positive terminal may be attached to several plates, for example every other plate, and the negative terminal may be attached to several other plates, for example every other of the other plates, in an alternating fashion (for example, +/−/+/−/+/− fashion). In certain embodiments, for example, the plurality of electrolysis plates may be fully immersed (or at least 50% immersed) in the electrolyte solution. In certain embodiments, for example, the plurality of plates may be at least partially insulated to reduce (for example by at least 50% or at least 95%) or prevent direct electrochemical communication expressed as Watts of energy transferred between non-adjacent plates without first undergoing electrochemical communication with at least one adjacent plate.

In certain embodiments, for example, the electrolysis plates may comprise between 5 and 15 plates (for example 7-12 plates). In certain embodiments, for example, the plurality of electrolysis plates may have a thickness of 0.5-4 mm, for example 1-2 mm. In certain embodiments, for example, the plurality of electrolysis plates may be separated by a distance in the range of 0.5-8 mm from one another (for example 0.5-1.5 mm of separation). In certain embodiments, for example, at least two of the plurality of electrolysis plates may comprise a point for attaching to at least one electrode. In certain embodiments, for example, the electrolysis cell may further comprise a slot for securing at least one of the plurality of electrodes. In certain embodiments, for example, at least a portion of at least one surface of at least one of the plurality of electrolysis plates may comprise (for example be coated with) a high conductivity material, for example platinum or a platinum-containing alloy. In certain embodiments, for example, at least a portion of at least one surface of at least one of the plurality of electrolysis plates may be coated with titanium or a titanium-containing alloy. In certain embodiments, for example, at least a portion of at least one surface of at least one of the plurality of electrolysis plates may be coated with iridium or an iridium-containing alloy. In certain embodiments, for example, at least one of the plurality of electrolysis plates (for example inclusive of all of the electrolysis plates) may comprise at least one hole. In certain embodiments, for example, the plurality of electrolysis plates may be arranged such that the holes of each pair of adjacent plates are not aligned. In certain embodiments, for example, the plurality of electrolysis plates may be arranged such that the holes of each pair of adjacent plates may be located in opposite corners. In certain embodiments, for example, the electrolysis cell may further comprise an electrical isolator between each pair of adjacent plates of the plurality of electrolysis plates.

In certain embodiments, for example, the plurality of electrolysis plates may be electrically insulated from the pressure-resistant container. In certain embodiments, for example, the interior of the pressure-resistant container may comprise an electric insulator (for example, and electrically insulating coating). In certain embodiments for example, an inner lining of the pressure-resistant container may comprise an electric insulator.

In certain embodiments, for example, the second defined space may have a volume of at least one quart (for example at least 1 gallon). In certain embodiments, for example, the second defined space may have a volume of no more than 10 gallons (for example no more than 5 gallons). In certain embodiments, for example, the second defined space may be in direct fluid communication with the pressure relief valve.

In certain embodiments, for example, the electrolysis cell may further comprise a heat exchanger in communication with, integral to, or connected to the gas outlet. In certain embodiments, for example, the pressure-resistant container may further comprise a housing. In certain embodiments, for example, the pressure-resistant container may further comprise a seal capable of preventing leakage of the electrolyte solution and the gas from the container.

In certain embodiments, for example, the first defined space may be configured to hold a volume of electrolyte solution to supply a sufficient amount of HHO gas for at least 1 month (for example at least 2 months) of operation of the host engine (i.e., the engine or engines it is supplying second fuel to). In certain embodiments, for example, the first defined space may be configured to hold a volume of electrolyte solution to supply HHO gas to a truck for at least 30,000 miles of driving or 60,000,000 crankshaft rotations. In certain embodiments, for example, the first defined space may be configured to hold at least 1-quart, ½-gallon, or 1-gallon of electrolyte solution. In certain embodiments, for example, the electrolyte solution may comprise an aqueous solution with a concentration of electrolyte of less than 2 percent by volume.

Certain embodiments may provide, for example, an apparatus for providing HHO gas for an internal combustion engine, comprising: an electrolysis cell for generating the HHO gas, and a plurality of HHO gas control valves (for example a plurality of injectors) configured to deliver the HHO gas to a plurality of intake ports of the internal combustion engine. In certain embodiments, one or more than one (including for instance all) of the following embodiments may comprise each of the other embodiments or parts thereof. In certain embodiments, for example, the plurality of injectors may comprise a number of injectors at least equal to a number of a plurality of engine cylinders. In certain embodiments, for example, the plurality of injectors may be designed to deliver the HHO gas within an intake manifold of the engine (i.e. the HHO gas is not mixed or does not come into contact with intake air until it is released from the tube (or lance) connected to the respective injector). In certain embodiments, for example, the plurality of injectors may deliver HHO gas within 3 inches (for example within 0.5 inches) from each intake port (or orifice of the intake valve) of a plurality of cylinders. In certain embodiments, the plurality of injectors may be positioned, configured, equipped, and/or designed to directly inject into the combustion chamber (in a fashion similar or the same as the primary fuel is injected into the combustion chamber in some applications). In certain embodiments, for example, at least one of the plurality of injectors may be positioned adjacent to at least one of the plurality of engine cylinders, at least a second injector of the plurality of injectors may be positioned adjacent to at least a second cylinder of the plurality of engine cylinders, and at least a third injector of the plurality of injectors may be positioned adjacent to at least a third cylinder of the plurality of engine cylinders In certain embodiments, for example, each of the plurality of injectors may be equipped with a lance that extends from the outlet end of the respective injector to a position proximate an intake port of a cylinder. The lances serve to deliver the HHO gas deep into the intake port near (for example, within 3 inches, or within 2 inches or between 0.5 to 2 inches or less than 1 inch from) an orifice of the intake valve. In certain embodiments, for example, the lance may deliver air-free HHO gas into the intake port. In certain further embodiments, for example, the HHO gas present in the lance may be air-free (or at least substantially air-free), in certain embodiments, air-free (or substantially air free) HHO gas provided by an injector may mix with air inside a portion of the lance.

In certain embodiments, for example, the engine may have for example from 6 to 20 cylinders and the HHO gas distribution system may have a corresponding number of injectors to service each of the cylinders (for example, an 8 cylinder engine may be fitted with 8 HHO gas injectors (one positioned to feed HHO gas into the respective intake port for each cylinder) or 16 HHO gas injectors (two positioned to feed HHO gas into the respective intake port for each injector).

Certain embodiments may provide, for example, an apparatus for providing HHO gas for an internal combustion engine, comprising: an electrolysis cell for generating the HHO gas, and a flow regulator configured to start and stop a flow of the HHO gas from the electrolysis cell to a plurality of injectors of the internal combustion engine. In certain embodiments, one or more than one (including for instance all) of the following embodiments may comprise each of the other embodiments or parts thereof. In certain embodiments, for example, the apparatus may further comprise a gas pressure regulator. In certain embodiments, for example, the gas pressure regulator may control the gas pressure at an outlet port. In certain embodiments, for example, the apparatus may further comprise a heat exchanger. In certain embodiments, for example, the heat exchanger may provide at least two separate fluid paths, wherein the at least two separate fluid paths may be in thermal communication. In certain further embodiments, for example, at least one of the at least two separate fluid paths may be configured to receive an engine coolant. In certain embodiments, for example, at least one of the at least two separate fluid paths may be configured to receive at least a portion of the gas generated from the electrolysis cell. In certain embodiments, for example, the heat exchanger may control the outlet temperature of gas exiting an outlet port. In certain embodiments, for example, the gas pressure regulator may be equipped with a heat exchanger (for example the foregoing heat exchanger). In certain further embodiments, for example, the gas pressure regulator may control the outlet pressure and outlet temperature of gas exiting an outlet port of the gas pressure regulator. In certain further embodiments, for example, the gas exiting the gas pressure regulator may be controlled to have a temperature greater than 35° C. (for example greater than 45° C.). In certain embodiments, for example, the HHO gas passing through the regulator may be cooled and/or heated by exchanging heat through the heat exchanger with engine coolant and therefore have a regulator exit temperature with plus or minus 10 degrees, for example ±5° C., of the engine coolant temperature. In certain embodiments, for example, use of the engine coolant to control the temperature of the HHO gas and/or use of the pressure regulator to control the pressure of the HHO gas may allow pre-determined amounts of the HHO gas to be introduced to at least one combustion chamber of a plurality of combustion chambers of the internal combustion engine. In certain embodiments, for example, the aforesaid temperature and pressure control may provide more precise control over the amount of HHO gas introduced into the internal combustion engine in comparison to a system lacking said controls (for example a traditional system for introducing electrolysis gases into an internal combustion engine).

In certain embodiments, for example, the gas pressure regulator pressure may be at least partially controlled relative to an intake manifold pressure (for example, 5-25 psi, or 10-15 psi higher than the air pressure in the intake manifold, downstream of a turbocharger) of the internal combustion engine. In certain embodiments, for example, the gas pressure regulator may be at least partially controlled by pressure communicated from an intake manifold pressure of the internal combustion engine. In certain embodiments, for example, the gas pressure regulator may be characterized by an opening pressure. In certain further embodiments, for example, the opening pressure may be configured based on the intake manifold pressure of the internal combustion engine. In certain embodiments, for example, the gas pressure regulator pressure may be at least partially controlled relative to an intake manifold pressure (for example, 5-25 psi, or 5-15 psi, or 5-8 psi, or 10-15 psi higher than the air pressure in the intake manifold, downstream of a turbocharger). In certain further embodiments, for example, the intake manifold pressure may vary based on and/or during the operation of the internal combustion engine.

Certain embodiments may provide, for example, an apparatus for providing HHO gas for an internal combustion engine, comprising: an electrolysis cell for generating the HHO gas, and a gas distribution harness comprising a plurality of tubes (or lances) configured to deliver the HHO gas to a plurality of intake ports of the internal combustion engine, for example a multi-point injection system. In certain embodiments, one or more than one (including for instance all) of the following embodiments may comprise each of the other embodiments or parts thereof. In certain embodiments, for example, the number of the plurality of lances may be equal to a number of a plurality of injectors or at least one injector, including all the injectors, may be fitted with multiple lances, for example, two or more lances configured to provide two or more points or injection for a single cylinder and/or provide multi-points of injection for multiple cylinders (for example, four injectors could each be fitted with, for example, two lances each and the first injector could serve to inject HHO gas within the intake port of the first and fourth cylinders of the host engine and, similarly, the second and third injectors could serve to inject HHO gas within the intake ports of the second and fifth cylinders, and the third and sixth cylinders, respectively. In certain embodiments, for example, at least one lance of the plurality of lances may comprise at least one outlet, at least a second lance of the plurality of lances may comprise at least a second outlet, and at least a third lance of the plurality of lances may comprise at least a third outlet. In certain embodiments, for example, the at least one outlet may be positioned within 3 inches (for example between 0.5 and 1.5 inches) of an air flow port of at least one cylinder of a plurality of cylinders of the internal combustion engine, the at least a second outlet may be positioned within 3 inches (for example between 0.5 and 1.5 inches) of an air flow port of at least a second cylinder of the plurality of cylinders, and at least a third outlet may be positioned within 3 inches (for example between 0.5 and 1.5 inches) of an air flow port of at least a third cylinder of the plurality of cylinders. In certain embodiments, for example, the at least one outlet may be positioned within 1 inch (for example within 0.25 inches) of an engine valve seat of a plurality of engine valve seats of the internal combustion engine, the at least a second outlet may be positioned within 1 inch (for example within 0.25 inches) of a second engine valve seat of the plurality of engine valve seats, and the at least a third outlet may be positioned within 1 inch (for example within 0.25 inches) of a third engine valve seat of the plurality of engine valve seats. In certain embodiments, for example, the at least one outlet may be positioned within 3 inches (for example between 0.5 and 1.5 inches) of an orifice of an air intake valve of at least one cylinder of the plurality of cylinders, the at least a second outlet may be positioned within 3 inches (for example between 0.5 and 1.5 inches) of an orifice of an air intake valve of at least a second cylinder of the plurality of cylinders, and the at least a third outlet may be positioned within 3 inches (for example between 0.5 and 1.5 inches) of an orifice of an air intake valve of at least a third cylinder of a plurality of cylinders.

Certain embodiments may provide, for example, a second fuel (for example an HHO gas) system for an internal combustion engine, comprising: a pressure-resistant container, a multi-point gas distribution system comprising a plurality of control valves to distribute separate portions of the second fuel to multiple locations about the internal combustion engine, and a multi-point gas distribution control system that controls the plurality of control valves to control the amount and timing of the delivery of the second fuel to the multiple locations about the internal combustion engine. In certain further embodiments, for example, the pressure resistant container may comprise an electrolysis cell configured to generate a second fuel from an electrolyte solution, and a storage volume to hold a volume of the second fuel at a pressure greater than 40 psia. In certain further embodiments, for example, the at least one of the multiple locations may comprise at least one air intake orifice. In certain further embodiments, for example, the multi-point gas distribution control system may be configured to deliver at least a portion of the second fuel in a timed sequence based on an intake stroke timing of the at least one air intake orifice. In certain further embodiments, for example, at least a second one of the at least one of the multiple locations may comprise at least one air intake orifice. In certain further embodiments, for example, the multi-point gas distribution control system may be further configured to deliver at least a second portion of the second fuel in a timed sequence based on an intake stroke timing of the at least one air intake orifice of the at least second one of the at least one of the multiple locations. In certain alternative embodiments, for example, the timed sequences may be batched (i.e., the second fuel may be delivered to groups of air intake orifices without regard to the timing of the air intake stroke of any one particular air intake orifice). In certain alternative embodiments, for example, the timing may be simultaneous (i.e., the second fuel may be delivered to all air intake orifices simultaneously). In certain embodiments, for example, the multi-point gas distribution system may be configured to provide an average of less than 15 liters, for example less than 10 liters, for example between 0.1 and 5 liters, or for example between 0.1 and 2 liters (as measured at for example control temperature and pressure or standard temperature and pressure) of the second fuel per 120,000 crankshaft revolutions of the host engine.

Certain embodiments may provide, for example, a retrofitted internal combustion engine configured to use a second fuel (for example an HHO gas) according to the second fuel system. In certain embodiments, for example, the retrofitted internal combustion engine may power a vehicle.

Certain embodiments may provide, for example, a system for on-demand delivery of HHO gas for an internal combustion engine, comprising: an electrolysis cell for generating the HHO gas, a controller for determining an amount of the HHO gas sufficient to reduce engine-out emissions to a pre-determined level, and an HHO injection apparatus, in communication with the controller, for delivering the HHO gas to at least one intake valve of the internal combustion engine. In certain embodiments, one or more than one (including for instance all) of the following embodiments may comprise each of the other embodiments or parts thereof. In certain embodiments, for example, the system may further comprise a regulator for regulating a temperature and a pressure of the HHO gas to be injected in the engine. In certain embodiments, for example, the system may further comprise a knock sensor configured to detecting engine knock and to send a signal to the controller to adjust the HHO injection when engine knock is detected. In certain embodiments, for example, the controller may at least partially control the generation of the HHO gas. In certain embodiments, for example, the system may further comprise an exhaust temperature sensor connected to the controller. In certain embodiments, for example, the controller may adjust the HHO injection when the temperature of engine exhaust exceeds a pre-determined temperature level. In certain embodiments, for example, the HHO gas may be distributed individually to each intake valve of each cylinder via a multi-point HHO gas injection (also called port gas injection or MPI). In certain embodiments, for example, the multi-point injection may inject gas into the intake ports just upstream of each cylinder's intake valve, rather than at a central point within an intake manifold. In certain embodiments, for example, multi-point injection may be sequential, wherein injection of the HHO gas may be timed to coincide with each cylinder's intake stroke; batched, wherein HHO gas may be injected to the cylinders in groups, without precise synchronization to any particular cylinder's intake stroke; or simultaneous, wherein HHO gas may be injected at the same time to all the cylinders. In certain embodiments, for example, the multi-point injection may deliver the HHO gas directly into the cylinder, i.e., direct injection.

In certain embodiments, for example, the HHO gas may be delivered to the engine at a pressure in the range of 100-500 kPa (for example in the range of 100-400 kPa). In certain embodiments, for example, the HHO gas may be delivered to the engine at temperature in the range of 35-120° C. (for example at a temperature in the range of 35-75° C.). In certain embodiments, for example, the HHO gas may be delivered to the intake port of at least one cylinder of the engine at a temperature in the range of 100-130° F. In certain embodiments, for example, the HHO gas may be delivered to the intake port of at least one cylinder of the engine at a pressure in the range of 100-500 kPa. In certain embodiments, for example, the controller may further control the volume of HHO gas injected based, at least in part on the engine demand, load, fuel consumption, and/or air flow. In certain embodiments, for example, a timing and duration of at least one HHO gas injector may be controlled at least in part based on the engine demand.

In certain embodiments, for example, the system may further comprise an HHO temperature sensor connected to the controller. In certain further embodiments, for example, the controller may adjust the HHO injection when the temperature of the HHO gas is outside a pre-determined temperature range. In certain embodiments, for example, the system may further comprise an HHO pressure sensor connected to the controller. In certain embodiments, for example, the controller may adjust the HHO injection when the pressure of the HHO gas exceeds a pre-determined pressure level. In certain embodiments, for example, the controller may comprise an anti-surge protector. In certain embodiments, for example, the controller may comprise a processor configured to calculate an amount of the HHO gas sufficient to reduce engine-out emissions to a pre-determined level based on engine operating parameters. In certain embodiments, the controller may comprise a seal to prevent water intrusion.

In certain embodiments, for example, the electrolysis cell may include any of the electrolysis cell embodiments disclosed herein. In certain embodiments, for example, the electrolysis cell may comprise a pressure-resistant container comprising a first defined space for holding an electrolyte solution, a plurality of electrolysis plates retained within the first defined space, and a second defined space for holding a gas, wherein a volume of the second defined space may be greater than the volume of the first defined space. In certain embodiments, for example, the pressure-resistant container may further comprise a positive terminal, a negative terminal, a gas outlet, an electrolyte solution fill port and/or a/drain port. In certain embodiments, for example, the electrolysis cell may further comprise a heat exchanger in communication with, integral to, or connected to the gas outlet.

Certain embodiments may provide, for example, a system for onboard, on-demand delivery of an HHO gas for an internal combustion engine (for example for a vehicle), comprising: an electrolysis cell configured to produce a required amount of HHO gas; and an HHO gas delivery system configured to deliver the HHO gas to the internal combustion engine. In certain embodiments, for example, delivery of the required amount of HHO gas may comprise delivering a portion of the required amount of HHO gas from the electrolysis cell to a position proximate an orifice (for example within 3 inches of the at least one orifice) of a combustion chamber intake valve, wherein said portion of the HHO gas does not contact combustion intake air until said portion reaches said position. In certain embodiments, for example, the HHO gas delivery system may deliver the portion of the HHO gas without causing any noticeable change in its chemical and/or performance properties to said position about the combustion chamber intake valve. In certain embodiments, for example, the internal combustion engine may provide power to a vehicle and the required amount of HHO gas may be generated by electrolyzing in the range of 4-16 ounces of water per 10,000 miles traveled by the host vehicle or in the range of 4-16 ounces of water per 20,000,000 crankshaft revolutions of the host engine. In certain embodiments, for example, the internal combustion engine may provide power to a vehicle and the required amount of HHO gas may be in the range of 300-1000 liters per 10,000 miles or per 20,000,000 crankshaft revolutions, based on a gas measured at a temperature of 25° C. and pressure of 1 atmosphere. In certain embodiments, for example, the HHO gas required may be in catalytic quantities.

In certain embodiments, for example, the required amount of HHO gas may be, on average, in the range of 1-10 liters per hour or per 120,000 crankshaft rotations, based on a gas temperature of 25° C. and pressure of 1 atmosphere. In certain embodiments, for example, the required amount of HHO gas may be in the range of, on average, 1-10 liters per hour or per 120,000 crankshaft rotations, based on a gas temperature of within 20° C. of the temperature of engine coolant and a pressure of in the range of 40-50 psia. In certain embodiments, for example, the internal combustion engine may be a 15-liter diesel engine for a freight vehicle. In certain further embodiments, for example, the required amount of HHO gas may be in the range of, on average, 5-30 liters per hour or per 120,000 crankshaft rotations, based on a gas temperature of within 20° C. of the temperature of engine coolant and a pressure of in the range of 40-50 psia. In certain embodiments, for example, a doubling of the engine volume (for example from a 3-liter engine to a 6-liter engine) may increase the required amount of HHO gas by in the range of 5-15% (for example by approximately 10%). In certain embodiments, for example, the system may further comprise an HHO gas storage system configured to store an excess amount of HHO gas for at least 1 week (for example at least 1 months). In certain embodiments, for example, the required amount of HHO gas may be at least 1 liter of HHO (for example at least 1.5 liters) gas per each liter of engine displacement for every 120,000 crankshaft revolutions of the engine at a pressure of at least 100 kPa relative to the air intake pressure of a combustion chamber of the engine. In certain embodiments, for example, the electrolysis cell may be configured to store a volume of HHO gas sufficient to deliver the required amount of HHO gas for at least 120,000 crankshaft revolutions of the engine.

In certain embodiments, for example, the electrolysis cell may be configured to generate the required amount of HHO gas for extended operation of the internal combustion engine, wherein the temperature of the electrolysis cell does not exceed 80° C. (for example, does not exceed 65° C.). In certain embodiments, for example, the electrolysis cell may be powered by an 11-14 VDC power source. In certain further embodiments, for example, the electrolysis cell may comprise an electrolyte solution, wherein the concentration of one or more electrolytes present in the electrolyte solution may be selected, maintained, and/or adjusted to provide a current draw of less than 20 amps (for example less than 10 amps) at the operating voltage and temperature of the electrolysis cell. In certain further embodiments, for example, the electrolyte concentration may be lower than the concentration of electrolyte in a conventional electrolysis cell. In certain embodiments, for example, the electrolyte solution may be exclusive of sulfuric acid. In certain embodiments, for example, the electrolysis cell may be operated continuously (for example without pulsed width modulation) for a period of time (for example at least 10 minutes, at least 30 minutes, at least 1 hour, or indefinitely) without overheating, for example without heating to a temperature in excess of 65° C. In certain further embodiments, for example, an ability to operate the electrolysis cell continuously without overheating may be due at least in part to a low electrolyte concentration in the electrolyte solution (for example less than 2 vol. % of electrolyte, such as less than 0.5 vol. % of electrolyte) and/or a current draw of less than 15 amps (for example less than 10 amps). In certain embodiments, for example, the electrolysis cell may be powered by a 20-28 VDC power source. In certain further embodiments, for example, the concentration of the one or more electrolytes may be selected, maintained, and/or adjusted to provide a current draw of less than 10 amps at the operating temperature (for example an operating temperature of less than 80° C.) of the electrolysis cell. In certain embodiments, for example, the electrolysis cell may be configured to operate on less than 250 watts of DC power. In certain embodiments, for example, the electrolysis cell may be configured to have less than 3 ohm of resistance.

Certain embodiments may provide, for example, a vehicle comprising an internal combustion engine and an apparatus for providing HHO gas to the internal combustion engine. In certain embodiments, for example, the apparatus may comprise one of the HHO gas-providing apparatus described herein. In certain embodiments, for example, the vehicle may be a Class 8 truck comprising a heavy duty diesel engine. In certain further embodiments, for example, the heavy duty diesel engine may have a displacement in the range of 11-16 liters, for example in the range of 14-15 liters. In certain further embodiments, for example, the heavy duty diesel engine may have an engine speed of at least 1800 rpm, for example 2100 rpm. In certain further embodiments, for example, the heavy duty diesel engine may provide 1600-2000 ft-lb peak torque. In certain further embodiments, for example, the heavy duty diesel engine may be sized to produce 430-500 hp. In certain embodiments, for example, the vehicle may be a delivery truck comprising a medium duty diesel engine. In certain further embodiments, for example, the medium duty diesel engine may be a 6 cylinder inline engine. In certain embodiments, for example, the medium duty diesel engine may have a displacement in the range of 6-11 liters. In certain embodiments, for example, the vehicle (for example a Dodge Ram truck or a Ford F150 truck) may be a light truck comprising a light duty high speed diesel engine. In certain further embodiments, for example, the light duty high speed diesel engine may have a displacement in the range of 2-6 liters. In certain embodiments, the light duty high speed diesel engine may have an engine speed of 4000-4500 rpm. In certain embodiments, the light duty high speed diesel engine may be sized to produce 200-250 hp. In certain embodiments, for example, the light duty high speed diesel engine may be a 6-cylinder inline engine, a V6 engine, or a V8 engine. In certain embodiments, for example, the vehicle may be a pleasure boat comprising an internal combustion engine having a displacement in the range of 4-20 liters, for example a displacement in the range of 4-8 liters, or the internal combustion engine having a displacement in the range of 8-18 liters.

Certain embodiments may provide, for example, a generator comprising an internal combustion engine and an apparatus for providing HHO gas to the internal combustion engine. In certain embodiments, for example, the apparatus may comprise one of the HHO gas-providing apparatus described herein. In certain embodiments, for example, the engine may be a generator set engine having a displacement in the range of 6-60 liters. In certain further embodiments, for example, the generator set engine may be a V8, V12, V16, or V20 engine having an engine displacement of 2-6 liters per cylinder. In certain embodiments, for example, the generate set engine may be sized to produce more than 1000 hp, for example the generator set engine may be sized to produce 1000-2000 hp.

Certain embodiments may provide, for example, method for reducing one or more emissions (for example regulated emissions, such as emissions of particulate matter or emissions of nitrogen oxides (NOx)) of an internal combustion engine (for example a gas engine or a diesel engine), comprising: controlling a temperature of an HHO gas by exchanging heat with an engine coolant; and delivering the HHO gas at the controlled temperature to at least one intake port of the internal combustion engine. In certain embodiments, for example, one or more engine-out emissions of the internal combustion engine (for example a Heavy-Duty Highway Compression-Ignition Engine) may fall within or meet the regulated emissions limits for the internal combustion engine specified in EURO emission standards and/or Environmental Protection Agency emission standards. In certain embodiments, for example, the engine-out emission levels for purposes of determining compliance with emissions standards (for example Environmental Protection Agency emission standards) may be based on standard test procedures (for example the Environmental Protection Agency Transient Test Procedure, the Not-to-Exceed (NTE) test, the Supplemental Emission Test (SET), or the Urban Dynamometer Driving Schedule (UDDS)). In certain further embodiments, for example, the emission levels may comprise 0.2 g/bhp-hr of nitrogen oxide and non-methane hydrocarbon and 0.01 g/bhp-hr [or other levels] of particulate matter on Environmental Protection Agency Transient Test Procedure. In certain further embodiments, for example, the internal combustion engine may be a nonroad compression-ignition engine and the emission levels may comprise Exhaust Emission Standards for Nonroad Compression-Ignition Engines. In certain further embodiments, for example, the internal combustion engine may be a generator set engine and the emission levels comprise Exhaust Emission Standards for generator sets. In certain further embodiments, for example, one or more emissions of an internal combustion engine (for example a Category M, Category N1-I, Category N1-II, Category N1-III, Category N2, HD Diesel, or non-road mobile machinery internal combustion engine may be reduced according to one or more Euro emission standards (for example one or more of the Euro I, Euro II, Euro III, Euro IV, Euro V, or Euro VI emission standards).

Certain embodiments may provide, for example, a method of improving efficiency of an electrolysis process (for example a process for the electrolysis of water), comprising: selecting a working volume of electrolyte solution whereby the process draws less than 15 A (for example less than 10 A, for example between 5 and 12 amps, or 7 and 11 amps) at 24 VDC, configuring the size and number of a plurality of electrolysis plates in an electrolysis cell whereby each of the plurality of plates may be fully submerged in the working volume of electrolyte solution, and optionally cooling the electrolyte solution to a temperature of 80° C. or less. In certain embodiments, one or more than one (including for instance all) of the following embodiments may comprise each of the other embodiments or parts thereof. In certain embodiments, for example, the method may further comprise storing a product of electrolysis (for example a gas) within the electrolysis cell. In certain embodiments, for example, each of the plurality of electrolysis plates form a parallel stack having 1-3 mm spacing between neighboring plates. In certain embodiments, for example, the method may further comprise warming the electrolysis cell to a temperature of greater than 80° C. (for example greater than 90° C.). In certain embodiments, for example, the cooling may comprise removing heat from the electrolyte solution to an engine coolant with a heat exchanger. In certain embodiments, for example, the cooling may comprise removing heat from the electrolyte solution to an engine coolant. In certain embodiments, for example, the cooling may be assisted by intermittent interruptions of the electrolysis process. In certain embodiments, for example, electrolyte solution may comprise an aqueous solution of sulfuric acid.

Certain embodiments may provide, for example, a method of delivering HHO gas to a combustion chamber of an internal combustion engine, comprising: delivering the HHO gas at a controlled temperature within 20° C. (for example within 10° C.) of an engine coolant temperature, pressurizing the HHO gas to a pressure within 500 kPa (for example within 400 kPa or 250 kPa) of an air intake port of the combustion chamber, and injecting the HHO gas into the air intake port.

Certain embodiments may provide, for example, a method of delivering HHO gas to a plurality of combustion chambers of an internal combustion engine, comprising: delivering the HHO gas at a controlled temperature within 10° C. of an engine coolant temperature, pressurizing the HHO gas to a pressure within 500 kPa (for example within 400 kPa or 250 kPa) of an air intake port of at least one combustion chamber of a plurality of combustion chambers, and delivering at least one portion of the HHO gas to within 3 inches of the intake valve of the at least one combustion chamber of the plurality of combustion chambers. In certain further embodiments, for example, the method may further comprise delivering at least a second portion of the HHO gas to within 3 inches of an intake valve of at least a second combustion chamber of the plurality of combustion chambers, and further delivering at least a third portion of the HHO gas to within 3 inches of an intake valve of at least a third combustion chamber of the plurality of combustion chambers.

Certain embodiments may provide, for example, a method of delivering HHO gas to a plurality of combustion chambers of an internal combustion engine, comprising: delivering the HHO gas at a controlled temperature within 10° C. (for example, within 5° C.) of engine coolant temperature, pressurizing the HHO gas to a pressure within 500 kPa (for example within 400 kPa or 250 kPa) of a first air intake port of at least one of the plurality of combustion chambers, and delivering the HHO gas directly into a plurality of air intake ports (for example, in the range of 4-12 intake ports, for example 6 or 8 intake ports).

Certain embodiments may provide, for example, a method of delivering HHO gas to a combustion chamber of an internal combustion engine, comprising: delivering the HHO gas at a controlled temperature within 10° C. of engine coolant temperature, pressurizing the HHO gas to a pressure within 500 kPa (for example within 400 kPa or 250 kPa) of an air intake port of the combustion chamber, and delivering a portion of the HHO gas into the intake port.

Certain embodiments may provide, for example, an electrolysis unit for supplying HHO gas as a boost fuel for a vehicle, comprising: a high pressure container comprising: a gas storage portion and a gas generation portion (for example the gas generation portion may comprise an electrolysis cell). In certain further embodiments, for example, the gas generation portion may be capable of generating a quantity of gas greater than the average demand for the vehicle. In certain further embodiments, for example, the gas storage portion may be sufficiently sized to store a quantity of gas that exceeds 90% of a peak demand (for example the average peak demand for a specified period of time) for the vehicle. In certain embodiments, one or more than one (including for instance all) of the following embodiments may comprise each of the other embodiments or parts thereof.

In certain embodiments, for example, the gas storage portion may have a fixed volume. In certain embodiments, for example, the gas storage portion may comprise a head space above the gas generation portion. In certain embodiments, for example, the average demand may be in the range of 1-4 liters of HHO gas per hour or per 120,000 crankshaft rotations, based on a gas temperature of within 20° C. of the temperature of engine coolant and a pressure of in the range of 40-50 psia. In certain embodiments, for example, the average peak demand may be in the range of 20-30 liters of HHO gas per hour or per 120,000 crankshaft rotations, based on a gas temperature of within 20° C. of the temperature of engine coolant and a pressure of in the range of 40-50 psia. In certain embodiments, for example, the gas generation portion may produce HHO gas intermittently (for example for less than 20 minutes before pausing). In certain embodiments, for example, HHO gas generation may be for less than 12 minutes per hour or per 120,000 crankshaft rotations. In certain embodiments, for example, HHO gas generation may be regulated to maintain the electrolysis unit at a temperature below 80 deg. C.

Certain embodiments may provide, for example, a method to operate an electrolysis unit comprising a variable pressure zone, comprising: selecting a first pressure and a second pressure of the variable pressure zone whereby HHO gas initially at the first pressure may be discharged to meet a peak energy demand for a specified period without falling to a pressure below the second pressure, generating HHO gas until the variable pressure zone reaches the first pressure; separately generating HHO gas at a rate sufficient to meet an average energy demand. In certain embodiments, for example, the first pressure may be 50 psia and the second pressure may be 40 psia.

Certain embodiments may provide, for example, a method of improving a fuel economy of an internal combustion engine, comprising: injecting into each cylinder of the engine less than 1 liter (for example less than 0.3 liter) of the HHO gas per liter of cylinder displacement at a pressure of less than 500 kPa; and achieving a fuel economy improvement of more than 10% (for example more than 15%). Certain embodiments may provide, for example, a method of reducing one or more engine-out emissions (for example PM and/or NOx emissions) of an internal combustion engine, comprising: injecting into each cylinder of the engine less than 1 liter (for example less than 0.3 liter) of the HHO gas per liter of cylinder displacement at a pressure of less than 500 kPa; and achieving a reduction in the one or more engine-out emissions of at least 25% (for example a reduction of at least 50%). In certain further embodiments, for example, at least one of the one or more engine-out emissions may be reduced below corresponding regulatory limits, for example 2002, 2004, 2007, 2010, 2014 Environmental Protection Agency emission limits and/or Euro I, Euro II, Euro III, and or Euro VI emission limits].

Certain embodiments may provide, for example, a method of improving a fuel economy of a vehicle or genset powered by an internal combustion engine, comprising: injecting a portion of an onboard-generated HHO gas into at least one cylinder of a plurality of cylinders of the internal combustion engine at a pressure greater than 30 psi and at a temperature within 10° C. of the operating temperature of a coolant for the internal combustion engine, and at a distance within 3 inches of an air intake valve of the at least one cylinder of the plurality of cylinders, wherein the HHO gas may be generated by an on-board electrolysis cell that may be powered by the internal combustion engine. In certain further embodiments, for example, the method may further comprise injecting a second portion of the onboard-generated HHO gas into at least a second cylinder of the plurality of cylinders at a pressure greater than 30 psi and at a temperature within 10° C. of the operating temperature of a coolant for the internal combustion engine, and at a distance within 3 inches of an air intake valve of the at least a second cylinder of the plurality of cylinders, and injecting a third portion of the onboard-generated HHO gas into at least a third cylinder of the plurality of cylinders at a pressure greater than 30 psi and at a temperature within 10° C. of the operating temperature of a coolant for the internal combustion engine, and at a distance within 3 inches of an air intake valve of the at least a third cylinder. In certain further embodiments, for example, injecting the portion, the second portion, and the third portion may be sequenced. In certain further embodiments, for example, the sequencing may be relative to a position of a first piston of a plurality of pistons (for example a piston for the first cylinder), a second piston of the plurality of pistons, and/or a third piston of the plurality of pistons. In certain embodiments, for example, the electrolysis cell may be further powered by battery, wherein the battery may be recharged by a charging unit that is powered by the combustion engine. In certain embodiments, for example, the vehicle's fuel economy may be increased by at least 5% on a miles per gallon of fuel basis, relative to identical conditions where the HHO gas is not injected (for example where the HHO gas is not generated).

Certain embodiments may provide, for example, a method of improving a fuel economy of a vehicle powered by an internal combustion engine, comprising: injecting a portion of an onboard-generated HHO gas into at least one cylinder of a plurality of cylinders of the internal combustion engine at a pressure greater than 30 psi and at a temperature within 10° C. of the operating temperature of a coolant for the internal combustion engine, and at a distance within 3 inches of a first air intake valve of the at least one cylinder of the plurality of cylinders, wherein the HHO gas may be generated by an on-board electrolysis cell that may be powered by the internal combustion engine. In certain further embodiments, for example, the method may further comprise injecting a second portion of the onboard-generated HHO gas into at least a second cylinder of the plurality of cylinders at a pressure greater than 30 psi and at a temperature within 10° C. of the operating temperature of a coolant for the internal combustion engine, and at a distance within 3 inches of an air intake valve of the at least a second cylinder of the plurality of cylinders, and injecting a third portion of the onboard-generated HHO gas into at least a third cylinder of the plurality of cylinders at a pressure greater than 30 psi and at a temperature within 10° C. of the operating temperature of a coolant for the internal combustion engine, and at a distance within 3 inches of an air intake valve of the at least a third cylinder of the plurality of cylinders. In certain further embodiments, for example, injecting the portion, the second portion, and the third portion may be sequenced. In certain further embodiments, for example, the sequencing may be relative to a position of a first piston of a plurality of pistons (for example a piston for the first cylinder), a second piston of the plurality of pistons, and/or a third piston of the plurality of pistons. In certain embodiments, for example, the electrolysis cell may be further powered by battery, wherein the battery may be recharged by a charging unit that is powered by the combustion engine. In certain embodiments, for example, the vehicle's fuel economy may be increased by at least 5% on a miles per gallon of fuel basis, relative to identical conditions where the HHO gas is not injected (for example where the HHO gas is not generated).

In certain further embodiments, for example, at least one of the one or more engine-out emissions (for example one or more of the emissions specified in the 2002, 2004, 2007, 2010, 2014 Environmental Protection Agency emission limits and/or Euro I, Euro II, Euro III, and or Euro VI emission limits) may be reduced by at least 5% (for example at least 10%) relative to identical conditions and duration where the HHO gas is not injected (for example where the HHO gas is not generated).

Certain embodiments may provide, for example, a second fuel injection system for an internal combustion engine, comprising a source of a second fuel, an injection system in fluid communication with said source of the second fuel, comprising at least one injector configured to control delivery of the second fuel, a line having an inlet in fluid communication with the outlet of said at least one injector and an outlet proximate at least one intake valve of the engine.

Certain embodiments may provide, for example, a booster gas injection system for an internal combustion engine, comprising a source of said booster gas, an injection system in fluid communication with said source of booster gas, comprising at least one booster gas injector configured to control delivery of at least a portion of said booster gas to a location proximate at least one intake valve of the engine.

Certain embodiments may provide, for example, a method for improving performance of an internal combustion engine, comprising multi-point variably injecting a second fuel directly into at least one intake port of the engine, wherein the second fuel is a product of electrolysis (for example electrolysis of an aqueous solution).

Certain embodiments may provide, for example, apparatus, methods, or systems to improve the performance of an internal combustion engine. In certain embodiments, one or more than one (including for instance all) of the following embodiments may comprise each of the other embodiments or parts thereof. Certain embodiments may provide, for example, apparatus, methods, or systems to improve the fuel economy of an internal combustion engine. Certain embodiments may provide, for example, apparatus, methods, or systems to reduce the emissions of an internal combustion engine. Certain embodiments may provide, for example, apparatus, methods, or systems to improve the efficiency of aftertreatment devices of an internal combustion engine. Certain embodiments may provide, for example, apparatus, methods, or systems to reduce the fuel consumption of an internal combustion engine. Certain embodiments may provide, for example, apparatus, methods, or systems to improve the brake thermal efficiency of an internal combustion engine. Certain embodiments may provide, for example, apparatus, methods, or systems to reduce particulate matter (for example particulate matter) emissions. Certain embodiments may provide, for example, apparatus, methods, or systems to reduce the amount of fine and ultra-fine particulates.

Certain embodiments may provide, for example, apparatus, methods, or systems to improve the performance of an internal combustion engine (for example a gasoline engine, a diesel engine, a marine engine, or a 2-stroke engine). In certain embodiments, for example, internal combustion engines may realize a fuel economy increase of at least 1% (for example at least 2%, at least 5%, or at least 20%).

Certain embodiments may provide, for example, apparatus, methods, or systems to achieve substantially complete combustion, or at least more complete combustion, within the internal combustion engine (for example greater combustion of at least than 10%, for example more than 20%).

Certain embodiments may provide, for example, apparatus, methods, or systems to improve the operation of the internal combustion engine. In certain embodiments, one or more than one (including for instance all) of the following embodiments may comprise each of the other embodiments or parts thereof. In certain embodiments, for example, the internal combustion engine may operate at a cooler temperature and/or may run cleaner. In certain embodiments, for example, the internal combustion engine may generate more power or more consistent or even power output for the same or lower amount of fuel. In certain embodiments, for example, the internal combustion engine may generate exhaust temperatures more suitable for efficient operation of exhaust aftertreatment systems. In certain embodiments, for example, the internal combustion engine may generate exhaust temperatures more suitable for efficient operation of diesel particulate filter (DPF). In certain embodiments, for example, the internal combustion engine may generate exhaust temperatures more suitable for efficient operation of selective catalytic reactor (SCR). In certain embodiments, for example, the internal combustion engine may generate exhaust temperatures more suitable for efficient operation of diesel oxidation catalyst (DOC). In certain embodiments, for example, the internal combustion engine may generate exhaust temperatures more suitable for efficient operation of NOx trap.

Certain embodiments may provide, for example, apparatus, methods, or systems to introduce a second fuel (for example a second fuel exclusive of a petroleum-derived fuel) into an internal combustion engine. In certain embodiments, for example, the second fuel (also referred to as booster gas or enhancement gas or HHO gas throughout this application, unless specifically defined otherwise) may comprise hydrogen, oxygen and/or mixtures thereof derived from electrolysis of an aqueous solution comprising ions, for example an electrolysis solution. In certain embodiments, for example, the second fuel may substantially comprise hydrogen, oxygen and/or mixtures thereof. In certain embodiments, for example, the second fuel may predominantly comprise hydrogen, oxygen and/or mixtures thereof. In certain embodiments, for example, the second fuel may be a product of electrolysis. In certain embodiments, the second fuel or components of the second fuel, for example hydrogen may benefit the combustion reaction by serving as a catalyst.

Certain embodiments may provide, for example, apparatus, methods, or systems to produce an oxygen-hydrogen gas mixture (for example an oxygen-hydrogen gas mixture for use as a second fuel in an internal combustion engine). In certain embodiments, for example, the gas mixture may be an oxygen-rich or hydrogen-rich a gas mixture. In certain embodiments, for example, the gas mixture may comprise one or more of aqueous solution electrolysis components (for example monatomic oxygen and/or monatomic hydrogen).

Certain embodiments may provide, for example, apparatus, methods, or systems to produce a gas mixture that is approximately two parts hydrogen to one part oxygen (for example 2:1) or less than 2:1 (for example 1.75:1, 1.5:1, 1.25:1, 1:1, 0.75:1, or 0.5:1). In certain embodiments, for example, the gas mixture produced may be modified before being delivered to the internal combustion engine. In certain embodiments, for example, the gas mixture may be combined with an additive and/or the composition of the gas mixture may be modified by adding, recycling or removing portions of the gas mixture. In certain embodiments, for example, an apparatus, method, or system may generate hydrogen and oxygen at a hydrogen to oxygen ratio of 2:1, but some of the hydrogen or oxygen, for example oxygen, may be trapped in bubbles, and the apparatus, method, or system may be configured to release the trapped oxygen to effectively deliver more oxygen to the internal combustion engine.

Certain embodiments may provide, for example, apparatus, methods, or systems to result in a more reliably controlled gas mixture generation process. In certain embodiments, for example, the current provided to the system for gas generation may be continually or continuously regulated or controlled, for example, in real time (or substantially real time), so as to provide predetermined or controlled quantity of gas, for example, in relation to the engine speed and/or demand.

Certain embodiments may provide, for example, apparatus, methods, or systems to utilize a substantially closed-loop system that recycles a water-reagent (or water-electrolyte or aqueous solution electrolysis component) mixture to reduce its consumption.

Certain embodiments may provide, for example, apparatus, methods, or systems to alter combustion (for example diesel combustion) chemistry to reduce particulate formation, for example reduce particulate formation by greater than 5% (for example greater than 10%).

Certain embodiments may provide, for example, apparatus, methods, or systems to increase the concentration of an oxidizer in an internal combustion engine, for example increase the amount of oxidizers by at least 5% (for example by at least 20%).

Certain embodiments may provide, for example, apparatus, methods, or systems that serve as a mechanism for distributing the oxidizer for more even air/fuel mixture.

Certain embodiments may provide, for example, apparatus, methods, or systems to generate a gas mixture that is an accelerant to speed combustion, enhance combustion, and/or increase the extent of combustion.

Certain embodiments may provide, for example, apparatus, methods, or systems to displace air with oxygen and/or hydrogen within the engine's intake system. In certain embodiments, one or more than one (including for instance all) of the following embodiments may comprise each of the other embodiments or parts thereof. In certain embodiments, for example, an apparatus, method, or system may displace air within the engine's intake system with the gas mixture, resulting from the gas mixture generator system. In certain embodiments, for example, an apparatus, method, or system may be used to create a shorter combustion process that lowers the engine temperature thereby reducing the formation of nitrogen oxides. In certain embodiments, for example, an apparatus, method, or system may generate a gas mixture resulting from electrolysis of an aqueous solution and introducing at least a portion of the gas mixture into the engine's intake for improved combustion. In certain embodiments, for example, an apparatus, method, or system may generate a gas mixture resulting from electrolysis of an aqueous solution and introducing a substantial portion (for example greater than 95 wt. %), of the gas mixture into the engine's intake for improved combustion. In certain embodiments, for example, an apparatus, method, or system may generate a gas mixture resulting from electrolysis of an aqueous solution and storing the gas mixture in a storage tank instead of introducing the gas mixture into the engine's intake. In certain embodiments, for example, an apparatus, method, or system may generate an optimized or partially optimized quantity of a gas mixture, such as a gas mixture having one or more aqueous solution electrolysis components, into the engine's intake for improved combustion. In certain embodiments, for example, an apparatus, method, or system may be configured to produce in the range of between 1-7.5 liters of gas per minute and/or produce in the range of between 0.08-0.75 liters of gas per minute per liter of engine displacement.

Certain embodiments may provide, for example, a system or apparatus to generate a gas mixture for use with an internal combustion engine, the system or apparatus comprising a tank (for example an at least partially non-conductive tank) configured to store an aqueous solution consisting essentially of water and a predetermined quantity of electrolyte (for example the electrolyte may comprise KOH, $K_2CO_3$, NaOH, $Na_2CO_3$, and/or $H_2SO_4$). In certain embodiments, for example, one or more than one (including for instance all) of the following embodiments of the system or apparatus may comprise each of the other embodiments or parts thereof. In certain embodiments, for example, the system or apparatus may further comprise a cell (i.e., an electrolytic cell) configured for aiding in the electrolysis of the aqueous solution. In certain further embodiments, for example, the cell may comprise a plurality of plates arranged substantially parallel to one another and be spaced substantially equidistant from an adjacent one of the plurality of plates, and at least one seal located between the plurality of plates. In certain embodiments, for example, the at least one seal may produce a substantially watertight seal between adjacent ones of the plurality of plates. In certain embodiments, for example, the system or apparatus may further comprise a controller configured to apply a pulse width modulated voltage to the cell to generate the gas mixture within the cell. In certain further embodiments, for example, the controller may be configured to regulate the current provided to the cell by controlling the duty cycle of the pulse width modulated voltage. In certain embodiments, for example, the duty cycle may be controlled in real time and/or substantially real time. In certain embodiments, for example, the system or apparatus may further comprise an output for outputting the gas mixture to the internal combustion engine. In certain embodiments, for example, the gas mixture may be input into the tank prior to being output to the internal combustion engine. In certain embodiments, for example, the gas mixture may be output to the internal combustion engine without being input into the tank. In certain embodiments, for example, the gas mixture may be stored in the tank without being output to the internal combustion engine under certain operating conditions. In certain embodiments, for example, the gas generation system or apparatus may be integral with the gas storage tank. In certain embodiments, for example, the size of the tank may be selected such that the aqueous solution occupies less than ⅔ (for example less than ¼) the volume of the tank during operation. In certain embodiments, for example, the system or apparatus may comprise multiple tanks. In certain embodiments, for example, the cell may comprise at least two plates (for example at least 7 plates or at least 15 plates), a first plate configured to be coupled to a positive terminal of a voltage source and a second plate configured to be coupled to a negative terminal of the voltage source. In certain embodiments, for example, the cell may further comprise at least one neutral plate configured in a series relationship to the first plate and the second plate.

Certain embodiments may provide, for example, apparatus, methods, or systems to realize a fuel economy increase of at least 1%, (for example at least 5%, or for example between 8 and 12%, or at least 10%, 15% or from 1% to up to 20%).

Certain embodiments may provide, for example, apparatus, methods, or systems to improve the operation of an internal combustion engine. In certain embodiments, for example, the internal combustion engine may operate at a cooler temperature and/or may run cleaner.

Certain embodiments may provide, for example, apparatus, methods, or systems to produce an oxygen-hydrogen gas mixture, such as an oxygen-rich, oxygen-hydrogen gas mixture, or a hydrogen-rich oxygen-hydrogen gas mixture. In certain embodiments, one or more than one (including for instance all) of the following embodiments of the system or apparatus may comprise each of the other embodiments or parts thereof.

Certain embodiments may provide, for example, apparatus, methods, or systems to more reliably controlled gas mixture generation process. In certain embodiments, for example, the current provided for gas generation may be continually or continuously regulated or controlled, for example, in real time (or substantially real time), so a predetermined quantity of gas is consistently produced.

Certain embodiments may provide, for example, apparatus, methods, or systems to utilize a substantially closed-loop method of electrolysis that recycles a water-reagent (or water-electrolyte or aqueous solution electrolysis component) mixture in an effort to reduce its consumption.

Certain embodiments may provide, for example, apparatus, methods, or systems capable of altering combustion (for example diesel combustion) chemistry to reduce particulate formation (for example reduce particulate formation by greater than 5%, for example between 8% and 15% or by greater than 10%). In certain embodiments, for example, the concentration of an oxidizer in an internal combustion engine may be increased (for example increased by at least 5%, for example by at least 20%).

Certain embodiments may provide, for example, apparatus, methods, or systems to distribute the oxidizer for more even air/fuel mixture.

Certain embodiments may provide, for example, apparatus, methods, or systems to generate a gas mixture that is an accelerant to speed combustion and/or increase combustion completion.

Certain embodiments may provide, for example, apparatus, methods, or systems to displace air with oxygen and/or hydrogen within the engine's intake system.

Certain embodiments may provide, for example, apparatus, methods, or systems to create a shorter combustion process that lowers the engine temperature thereby reducing the formation of nitrogen oxides.

Certain embodiments may provide, for example, apparatus, methods, or systems to reduce the particulate emissions of an internal combustion engine. In certain embodiments, for example, a method may comprise the steps of generating a gas mixture for use within the internal combustion engine and providing the gas mixture to the internal combustion engine during operation of the internal combustion engine. In certain embodiments, for example, a method may comprise: generating a gas mixture for use within the internal combustion engine, and providing the gas mixture to the internal combustion engine during operation of the internal combustion engine. In certain embodiments, for example, the gas mixture may be generated in substantially real time relative to the consumption of the gas mixture. In certain embodiments, for example, the gas mixture may be generated onboard the vehicle during operation of the internal combustion engine.

Certain embodiments, may provide, for example, a booster gas injection system for an internal combustion engine, comprising: a source of said booster gas, an injection system in fluid communication with said source of booster gas. In certain further embodiments, for example, the injection system may comprise at least one booster gas injector configured to control delivery of at least a portion of said booster gas to a location proximate at least one intake valve of the engine. In certain embodiments, one or more than one (including for instance all) of the following embodiments of the system or apparatus may comprise each of the other embodiments or parts thereof. In certain embodiments, for example, the booster gas may be a gas mixture of hydrogen and oxygen. In certain embodiments, for example, the source of the booster gas may be a gas mixture generation system comprising: an electrolyte solution storage tank, an electrolysis cell, and a gas mixture storage, wherein the electrolyte solution storage tank, the electrolysis cell, and the gas mixture storage are integrated into a single unit. In certain embodiments, for example, delivery of the booster gas by each booster gas injector may occur during the opening of a cylinder intake valve of the internal combustion engine. In certain embodiments, for example, the injection system may further comprise a controller configured to input signals from at least one sensor, and configured to output a command to at least one actuator. In certain further embodiments, for example, the at least one sensor may comprise a throttle position sensor and/or a manifold pressure sensor. In certain further embodiments, for example, the at least one actuator may comprise an injector solenoid.

Certain embodiments may provide, for example, a second fuel injection system for an internal combustion engine, comprising: a source of a second fuel, and an injection system in fluid communication with said source of the second fuel. In certain further embodiments, for example, the injection system may comprise: at least one injector configured to control delivery of the second fuel, and a line having an inlet in fluid communication with the outlet of said at least one injector and an outlet proximate at least one intake valve of the engine. In certain embodiments, for example, the second fuel may be may be a gas mixture of hydrogen and oxygen. In certain embodiments, for example, the source of the second fuel may be a gas mixture generation system comprising: an electrolyte solution storage tank, an electrolysis cell, and a gas mixture storage, wherein the electrolyte solution storage tank, the electrolysis cell, and the gas mixture storage are integrated into a single unit.

Certain embodiments may provide, for example, a method for improving performance of an internal combustion engine, comprising: multi-point variably injecting a second fuel directly into at least one intake port of the engine, wherein the second fuel is a product of electrolysis of water and optionally one or more electrolytes and/or excipients. In certain embodiments, for example, the electrolysis may be accomplished in a batch process comprising: filling a tank with an electrolyte solution, applying electrical power to an electrolysis cell inside the tank, generating gas mixture in the electrolysis cell, storing gas mixture inside the tank (for example storing the gas mixture inside the tank at a pressure greater than atmospheric pressure), and releasing at least a portion of the gas mixture from the tank when requested by a controller. In certain embodiments, for example, the injecting may be controlled by a controller. In certain further embodiments, for example, the controller may be configured to input signals from at least one sensor, and the controller may be further configured to output a command to at least one actuator. In certain embodiments, for example, the variably injecting may comprise changing pressure or flow rate of the second fuel. In certain embodiments, for example, the injecting may comprise injecting the second fuel by a plurality of second fuel injectors. In certain further embodiments, for example, the number of the plurality of second fuel injectors may be the number of engine cylinders present in the internal combustion engine.

Certain embodiments may provide, for example, a gas mixture generation system, comprising: a tank, one or more sets of plates inside the tank, a gap between top edges of the plates and the bottom wall of the tank, electrical connections passing through the tank, insulating spacers between each pair of neighboring plates within each set of plates, an electrolyte solution filling a portion of the tank from the bottom wall to a level below a top edge of the plates, and at least one hole in each plate to allow a flow of the electrolyte solution. In certain further embodiments, for example, the tank may comprise a top wall, a plurality of side walls, and a bottom wall. In certain further embodiments, for example, each of the one or more sets of plates may comprise a left side plate, a right side plate, and one or more middle plates, wherein all plates of each set are substantially parallel to each other and substantially perpendicular to the top and bottom walls of the tank. In certain further embodiments, for example, the electrical connections may pass through the tank to each left side plate and to each right side plate Certain embodiments may provide, for example, a gas mixture generation system, comprising: an electrolyte solution storage tank, an electrolysis cell, and a gas mixture storage, wherein the electrolyte solution storage tank, the electrolysis cell, and the gas mixture storage are integrated into a single unit.

Certain embodiments may provide, for example, a gas mixture generation system, comprising: a housing, a bottom internal portion inside the housing, comprising an electrolysis cell, and a top internal portion inside the housing, comprising a gas mixture storage.

Certain embodiments may provide, for example, a batch process for generating a gas mixture, comprising: filling a tank with an electrolyte solution, applying electrical power to an electrolysis cell inside the tank, generating gas mixture in the electrolysis cell, storing gas mixture inside the tank, and releasing gas mixture from the tank when requested by a controller.

Certain embodiments may provide, for example, a tank for generating and storing a gas mixture, comprising: an external housing, an electrolyte solution inside the external housing, and a hole in the external housing for filling the tank with the electrolyte solution, an electrolysis cell inside the external housing comprising a plurality of substantially parallel plates including two side plates, at least one hole in each of the plurality of substantially parallel plates, a positive electrode connected to one of the two side plates and a negative electrode connected to the other of the two side plates, holes in the external housing for the positive electrode and for the negative electrode, a gas mixture storage above the electrolysis cell, and a hole in the external housing for gas mixture outlet. In certain embodiments, for example, the electrolysis cell may be immersed in the electrolyte solution such that a top portion of the electrolysis cell is above the level of the electrolyte solution.

Certain embodiments may provide, for example, a retrofitted internal combustion engine configured to utilize an HHO gas, comprising: an internal combustion engine comprising a plurality of combustion chambers, a retrofitted multi-point HHO gas distribution system, a retrofitted multi-point HHO gas distribution control system, and a multiplate electrolysis cell. In certain embodiments, for example, the retrofitted multi-point HHO gas distribution system may comprise an HHO gas distribution harness comprising an HHO gas pressure regulator, a plurality of injectors, and a plurality of lances connected to the plurality of injectors. In certain embodiments, for example, the HHO gas pressure regulator may comprise a heat exchanger that is integrated with a retrofitted engine coolant line. In certain embodiments, for example, the retrofitted multi-point HHO gas distribution control system may be configured to control the actuation of the injectors based on timing parameters of the internal combustion engine (for example based on the timing of air intake strokes of the plurality of combustion chambers). In certain embodiments, for example, the electrolysis cell may be integrated with a retrofitted power supply powered at least partially by the internal combustion engine.

DETAILED DESCRIPTION OF THE DRAWINGS

DETAILED DESCRIPTION OF THE INVENTION

Figure 1:
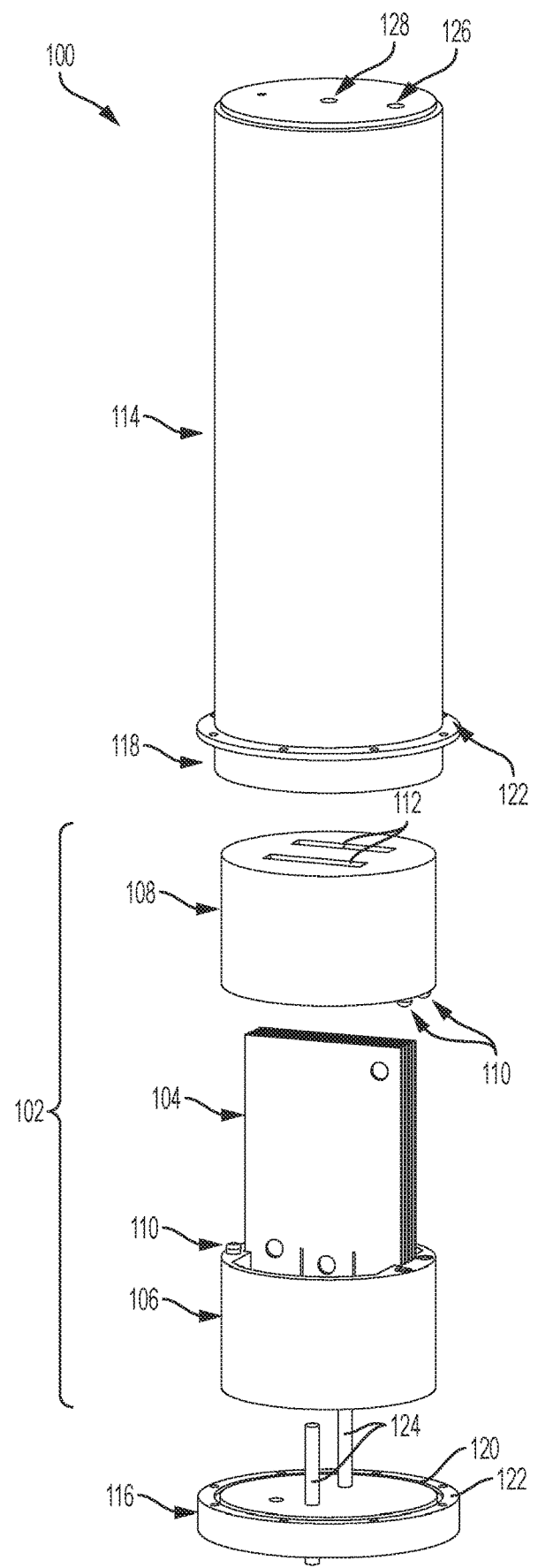
FIG. 1 is a schematic exploded view of a high pressure container housing an n HHO gas production apparatus.

Certain embodiments may provide, for example, an HHO gas production apparatus to provide a second fuel to an internal combustion engine. FIG. 1 is a schematic exploded view of a high pressure container housing an HHO gas production apparatus 100. The apparatus comprises an electrolysis cell 102 comprising a spaced stack of electrolysis plates 104 seated within an insulated plate holder comprising a lower portion 106 and an upper portion 108. The lower portion of the insulated plate holder 106 and the upper portion of the insulated plate holder 108 are oriented with respect to each other via alignment pegs 110. Electrolyte solution can be introduced and HHO gas removed from the electrolysis cell through slots 112 in the upper portion of the insulated plate holder 108. The electrolysis cell 102 is contained within a pressure resistant container comprising a top housing 114 and an insulated bottom cover 116. When assembled, the lower rim 118 of the top housing is seated in a groove 120 of the insulated bottom cover 116. The pressure resistant container is assembled and sealed with flange assembly 122. The top housing further comprises an electrolyte solution addition port 126 and gas removal port 128. The bottom cover 116 further comprises power terminals 124 used to supply electricity to the electrolysis cell.

Figure 2:
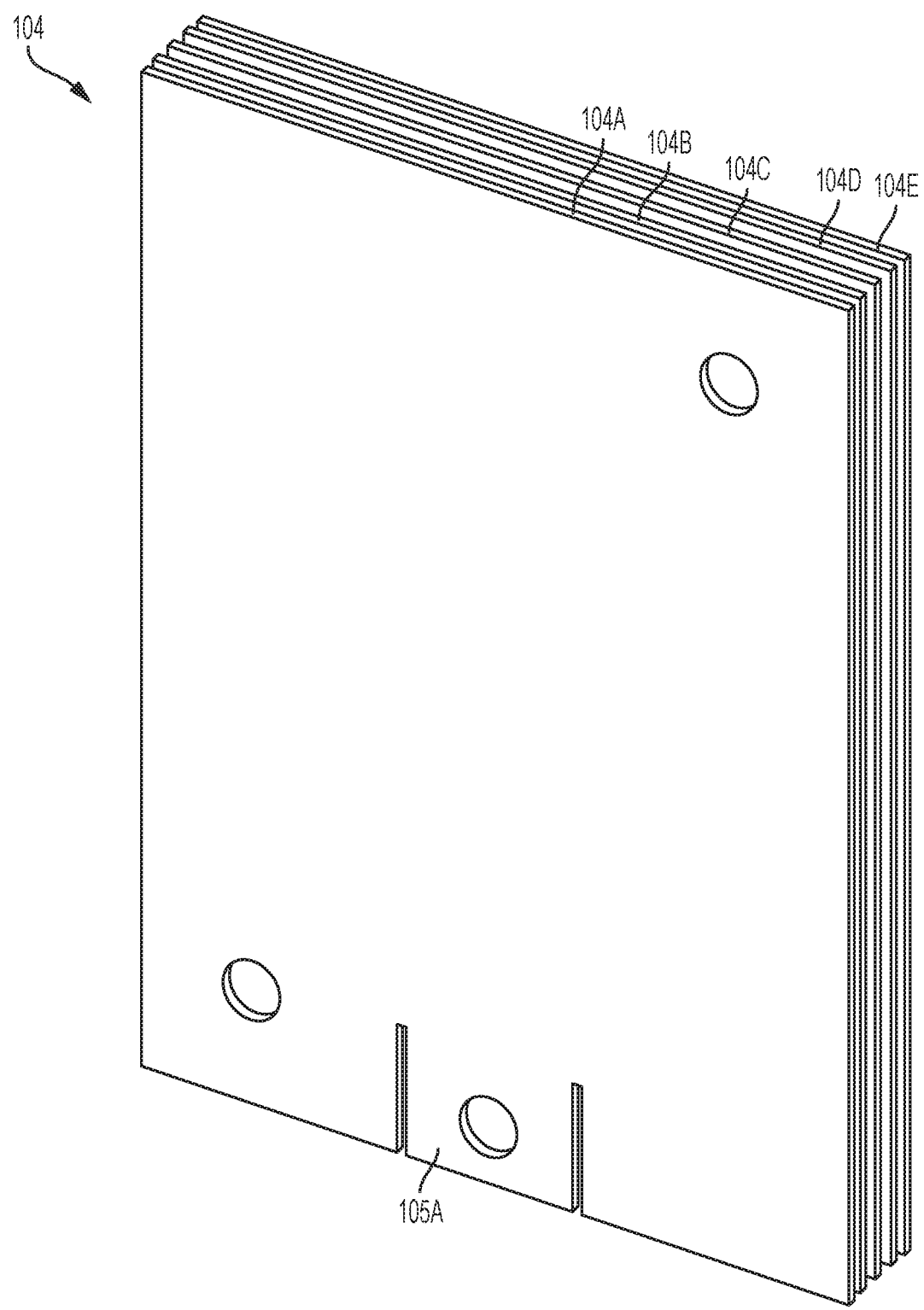
FIG. 2 is a schematic view of an electrolysis plate stack

FIG. 2 depicts an electrolysis plate stack 104 comprising five spaced-apart substantially parallel electrolysis plates 104A, 104B, 104C, 104D, and 104E. One of the power terminals 124 may be connected to terminal connector 105A.

Figure 3:
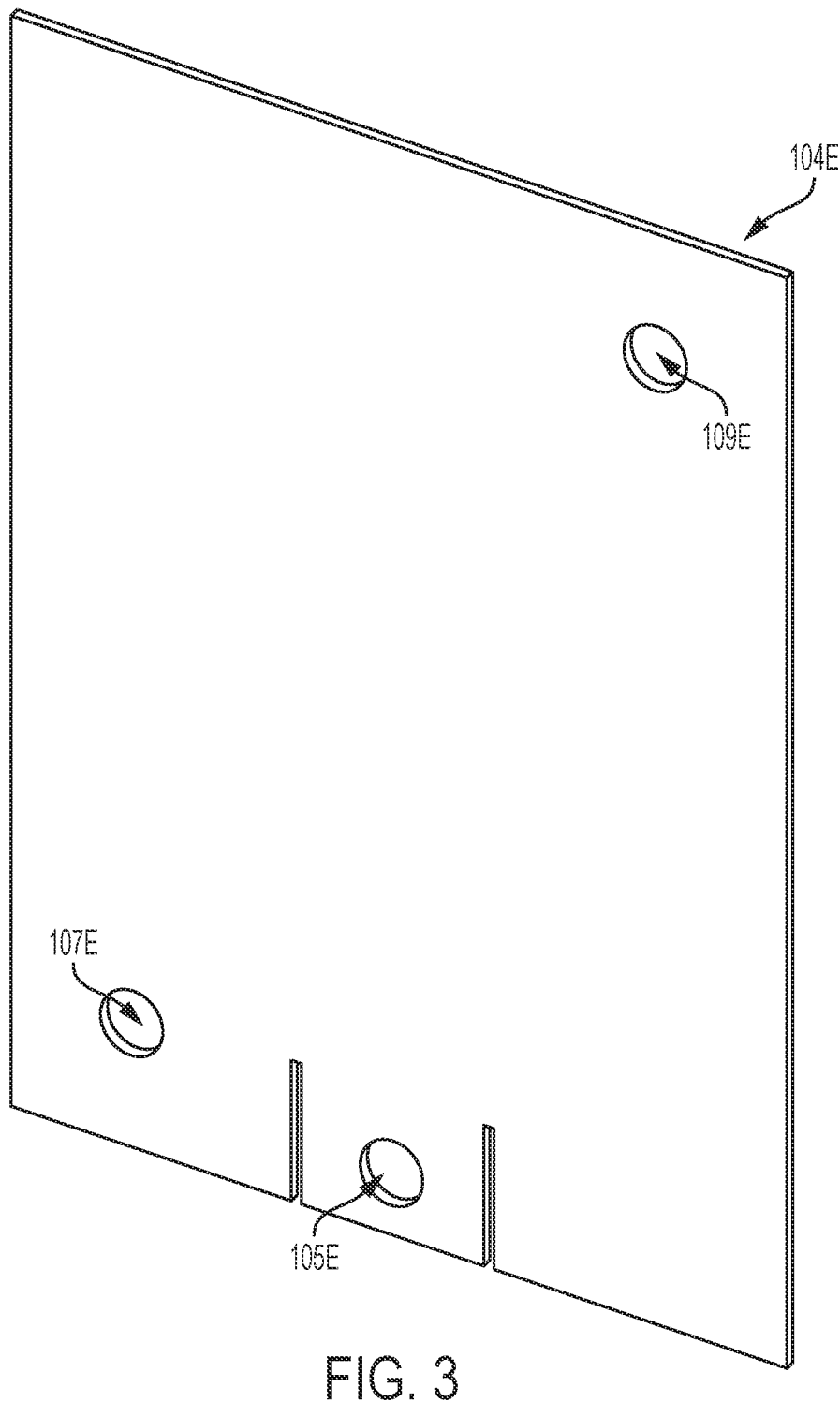
FIG. 3 is a schematic view of an electrolysis plate.

FIG. 3 depicts an electrolysis plate 104E comprising an electrolyte solution flow port 107E, an electrolyte solution flow and gas removal port 109E, and optional power terminal connector 105E.

Figure 4:
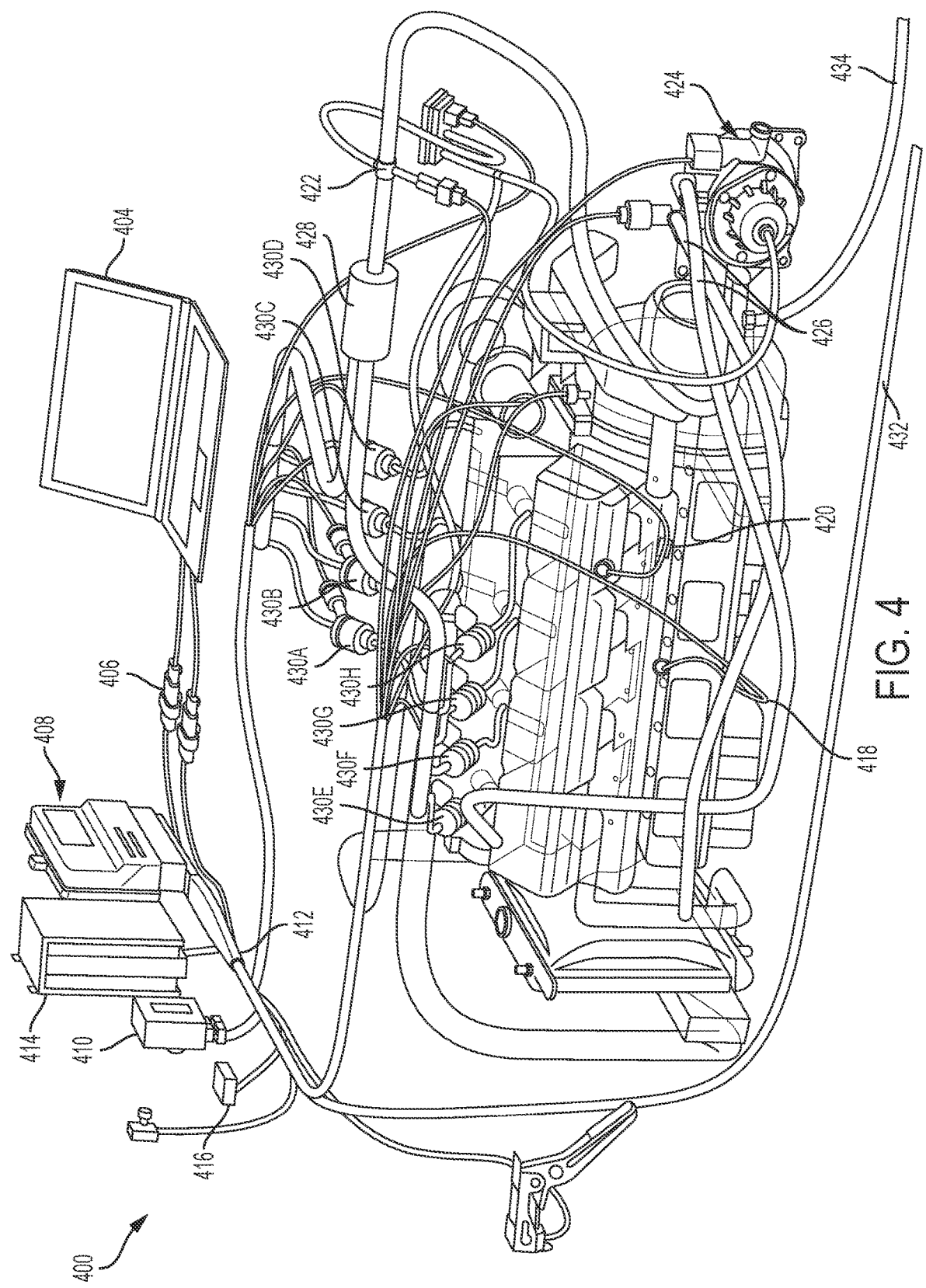
FIG. 4 is a schematic view of an HHO gas distribution harness with control wiring.
Figure 5:
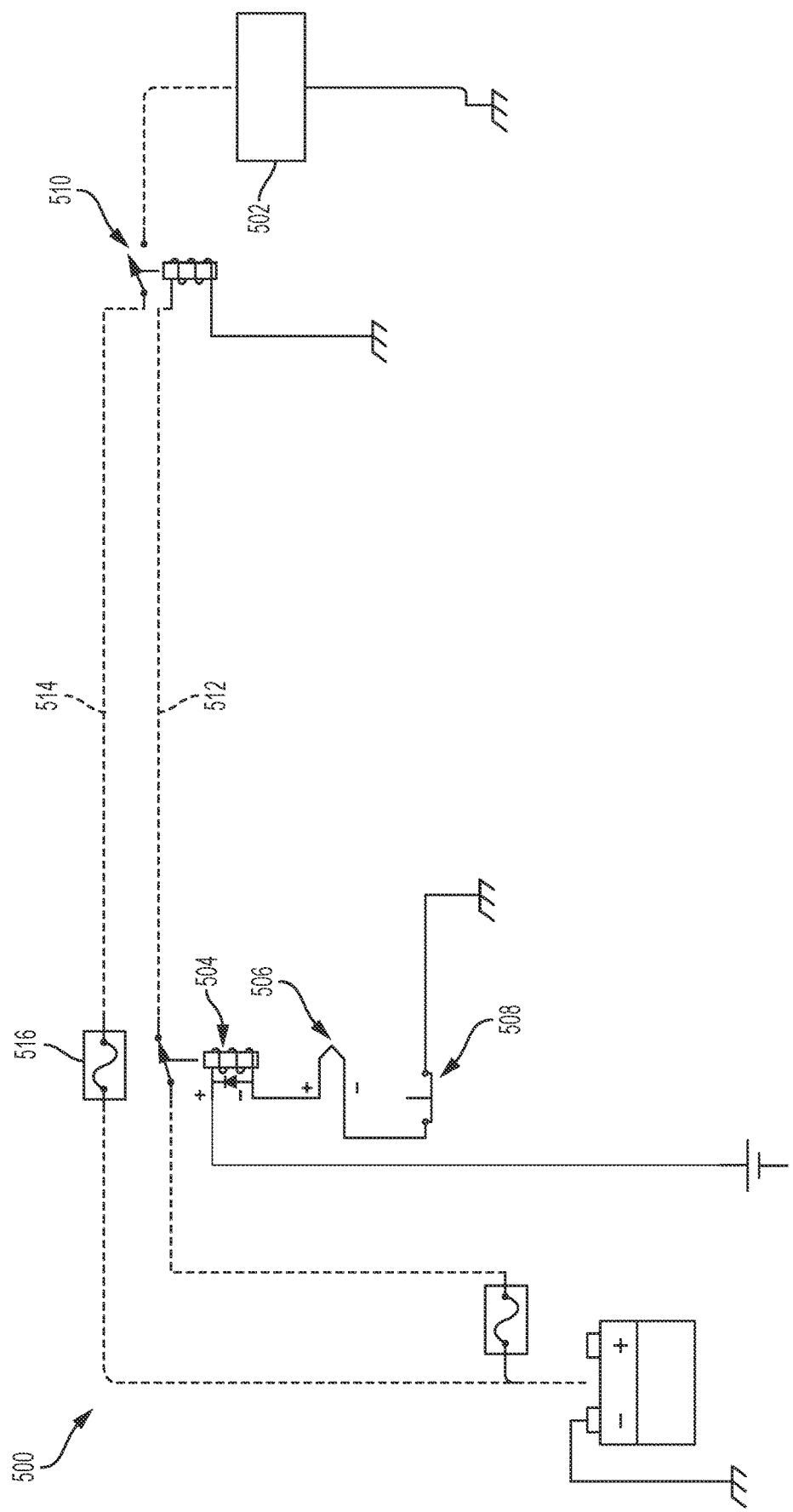
FIG. 5 is a schematic view of a control circuit for a HHO gas production apparatus.

FIG. 4 is a schematic view of an HHO gas distribution harness with control wiring 400. The HHO gas distribution harness is shown with a communication line 412, a voltage inverter 414 an audible alarm 416 and a programmable electronic control system (ECS) 410 in communication with a programming unit 404 by the programming lines 406. The ECS 410 optionally communicates with an engine control unit (ECU) 408. The ECS 410 is in communication with several sensors, including a knock sensor 418, an exhaust temperature sensor 420, and an HHO gas temperature sensor 422. In operation, HHO gas is introduced to a regulator 424 via supply line 434 and cooled with engine coolant circulated through engine coolant lines 426. Cooled HHO gas is passed through optional HHO line filter 428 and portions of the HHO gas are introduced to HHO gas injectors 430A-H. The ECS is in electrical communication with the control wiring of the HHO production apparatus, not shown, via line 432. FIG. 5 is a schematic view of a control circuit 500 for a HHO gas production apparatus 502. Control relay 504 is controlled by temperature switch 506 and pressure switch 508. Control relay 504 controls, via control line 512 power relay 510 configured to regulate power to the HHO gas production apparatus 502. Power to the apparatus is passed through a hi-amp breaker 516 and power relay 510 via power line 514.

Figure 6:
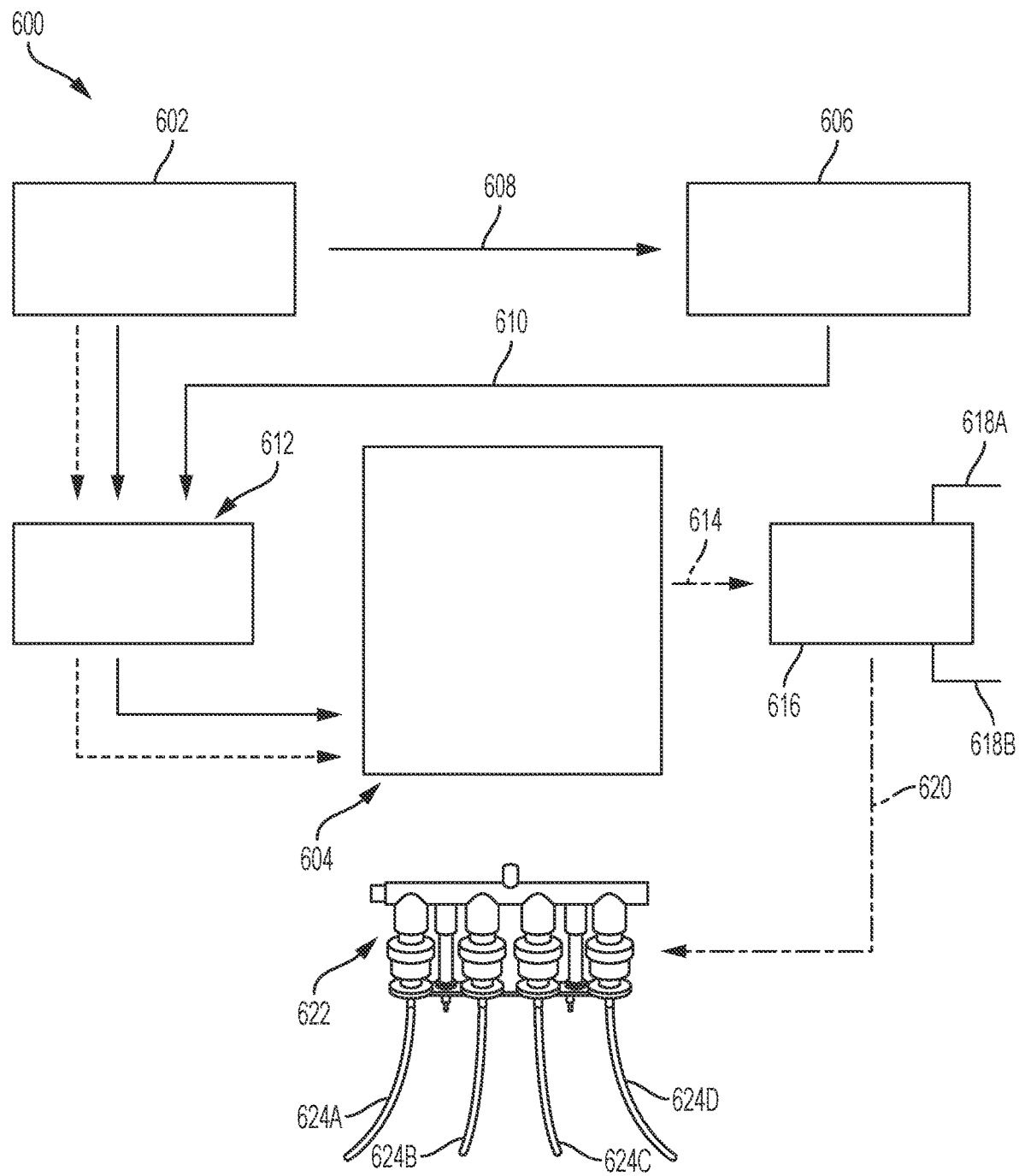
FIG. 6 is a schematic view of an HHO gas delivery system.

FIG. 6 is a schematic view of an HHO gas delivery system 600. In operation, a power source 602 provides power to an HHO gas production apparatus 604 and a central processing unit (CPU) 606. The CPU 606 receives power through ignition switch controlled line 608. The CPU 606 provides a control signal through a control signal line 610 to a power relay 612 to regulate power to the apparatus 604. HHO gas exits the apparatus 604 through an HHO gas outlet tubing 614 and is passed through the regulator 616 and cooled with engine coolant circulated through engine coolant lines 618 (A&B). Cooled HHO gas is then transmitted through a pressure regulated tubing 620 to an HHO gas injector manifold 622. The HHO gas injector manifold 622 distributes portions of the HHO gas through the set of injectors fitted with injector lances 624A, 624B, 624C, and 624D.

Figure 7:
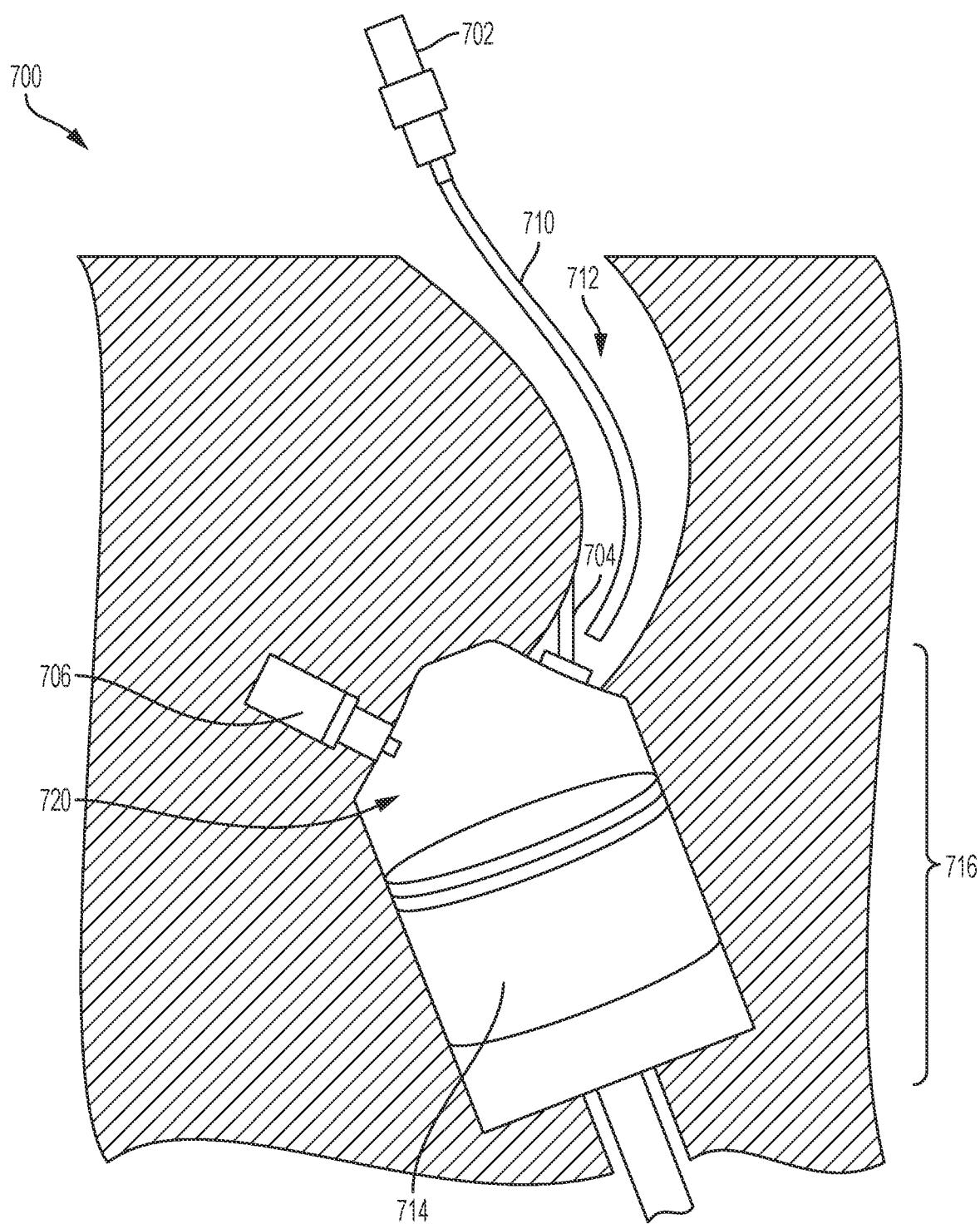
FIG. 7 is a partial cross-sectional view of an intake port equipped with a HHO gas injector and lance.

FIG. 7 is a partial cross-sectional view of an intake port 700. In operation, an HHO injector 702 delivers HHO gas proximate an intake valve 704 of a cylinder 716 through an HHO injector lance 710 positioned in an intake port 712 for the cylinder 716. The primary fuel, for example diesel or gasoline, is feed into the combustion chamber 720 via the fuel injector 706. HHO gas injection is timed relative to the position of the piston 714.

Certain embodiments may provide, for example, a second fuel for improving the performance of an internal combustion engine. In certain embodiments, for example, the internal combustion engine may be a light duty high speed diesel engine, a light heavy-duty diesel engine, a medium duty diesel engine, a medium heavy-duty diesel engine, a heavy heavy-duty diesel engine, a nonroad engine, a stationary engine, a locomotive engine, a marine engine, an aircraft engine, a generator set engine, a spark-ignition engine, a compression-ignition engine, nonroad compression-ignition engine, a naturally aspirated engine, a turbocharged engine, a turbocompound engine, a supercharged engine, a direct injection engine, an indirect injection engine, a port injection engine, a gasoline engine, a diesel engine, an ethanol engine, a methanol engine, a biofuel engine, a natural gas engine, a propane engine, or an alternative fuel engine.

In certain embodiments, for example, the internal combustion engine may provide power to one or more vehicles or gensets. In certain embodiments, for example, one of the one or more vehicles may be a passenger car, a light duty vehicle, a medium duty passenger vehicle, a truck (for example a passenger truck or a delivery truck), a light duty truck, a medium duty truck, a heavy duty truck, an urban bus, a motorcycle, a passenger car, a four tire single unit vehicle, a bus, a two axle six tire single unit vehicle, a three axle single unit vehicle, a four or more axle single unit vehicle, a four or less axle single trailer vehicle, a five axle tractor semitrailer, a six or more axle singe trailer, a five or less axle multi-trailer, a six axle multi-trailer, a seven or more axle multi-trailer, a Class 1 vehicle, a Class 2 vehicle, a Class 3 vehicle, a Class 4 vehicle, a Class 5 vehicle, a Class 6 vehicle, a Class 7 vehicle, a Class 8 vehicle (for example a Class 8 truck), a Class 9 vehicle, a Class 10 vehicle, a Class 11 vehicle, a Class 12 vehicle, a Class 13 vehicle a Category M vehicle, a Category M1 vehicle, a Category M2 vehicle, a Category M3 vehicle, a Category N1-I vehicle, a Category N1-II vehicle, a Category N1-III vehicle, a Category N2 vehicle, a Category N3 vehicle, a road vehicle, an offroad vehicle, a vessel, a boat, a marine vehicle (for example a pleasure boat), or an aircraft. In certain embodiments, for example, the one or more gensets may be a residential genset or a commercial genset or an industrial genset or a genset equipped with a 4-cylinder engine, or a 6-cylinder engine or between a 6-20 cylinder engine, or a 8-cylinder engine or from an 8- to 12-cylinder engine and the engine may be a mixed fuel engine, a diesel engine, a gasoline engine, and/or a natural gas engine.

In certain embodiments, for example, the vehicle may be a Class 8 truck comprising a heavy duty diesel engine. In certain further embodiments, for example, the heavy duty diesel engine may have a displacement in the range of 11-16 liters, for example in the range of 14-15 liters. In certain further embodiments, for example, the heavy duty diesel engine may have an engine speed of at least 1800 rpm, for example 2100 rpm. In certain further embodiments, for example, the heavy duty diesel engine may provide 1600-2000 ft-lb peak torque. In certain further embodiments, for example, the heavy duty diesel engine may be sized to produce 430-500 hp.

In certain embodiments, for example, the vehicle may be a delivery truck comprising a medium duty diesel engine. In certain further embodiments, for example, the medium duty diesel engine may be a 6 cylinder inline engine. In certain embodiments, for example, the medium duty diesel engine may have a displacement in the range of 6-11 liters.

In certain embodiments, for example, the vehicle (for example a Dodge Ram truck or a Ford F150 truck) may be a light truck comprising a light duty high speed diesel engine. In certain further embodiments, for example, the light duty high speed diesel engine may have a displacement in the range of 2-6 liters. In certain embodiments, the light duty high speed diesel engine may have an engine speed of 4000-4500 rpm. In certain embodiments, the light duty high speed diesel engine may be sized to produce 200-250 hp. In certain embodiments, for example, the light duty high speed diesel engine may be a 6-cylinder inline engine, a V6 engine, or a V8 engine.

In certain embodiments, for example, the vehicle may be a pleasure boat comprising an internal combustion engine having a displacement in the range of 4-20 liters, for example a displacement in the range of 4-8 liters, or the internal combustion engine having a displacement in the range of 8-18 liters.

In certain embodiments, for example, the engine may be a generator set engine having a displacement in the range of 6-60 liters. In certain further embodiments, for example, the generator set engine may be a V8, V12, V16, or V20 engine having an engine displacement of 2-6 liters per cylinder. In certain embodiments, for example, the generate set engine may be sized to produce more than 1000 hp, for example the generator set engine may be sized to produce 1000-2000 hp.

Certain embodiments may provide, for example, an electrolysis cell. In certain embodiments, for example, the electrolysis cell may comprise a pressure-resistant container. In certain further embodiments, for example, the pressure-resistant container may be configured and optionally rated to maintain a pressure in excess of 25 psig, for example a pressure in excess of 50 psig, in excess of 75 psig, in excess of 100 psig, or the pressure-resistant container may be configured and optionally rated to maintain a pressure in excess of 150 psig. In certain embodiments, for example, the pressure-resistant container may be configured and optionally rated to maintain a pressure of up to 100 psig, a pressure of up to 125 psig, up to 150 psig, or the pressure-resistant container may be configured and optionally rated to maintain a pressure of up to 200 psig.

In certain embodiments, for example, the electrolysis cell may further comprise a pressure relief valve configured to open when a pressure of gas inside the container exceeds 25 psig, for example a pressure in excess of 50 psig, in excess of 80 psig, in excess of 100 psig, in excess of 150 psig, or the electrolysis cell may further comprise a pressure relief valve configured to open when a pressure of gas inside the container exceeds 200 psig.

In certain embodiments, for example, the electrolysis cell may further comprise a first defined space may be configured to hold a volume of an electrolyte solution. In certain embodiments, for example, the first defined space may be configured to hold a volume of the electrolyte solution to supply a sufficient amount of HHO gas for at least 1 day of operation of a host engine (i.e., an engine or engines the electrolysis cell is supplying second fuel to), for example at least 2 days of operation, at least 1 week of operation, at least 2 weeks of operation, at least 3 weeks of operation, at least 1 month of operation, at least 2 months of operation, at least 3 months of operation, or the first defined space may be configured to hold a volume of the electrolyte solution to supply a sufficient amount of HHO gas for at least 6 months of operation of the host engine.

In certain embodiments, for example, the first defined space may be configured to hold a volume of electrolyte solution to supply HHO gas to a truck for at least 200 miles of driving, for example at least 400 miles of driving, at least 800 miles of driving, at least 1,200 miles of driving, at least 5,000 miles of driving, at least 10,000 miles of driving, at least 20,000 miles of driving, or the first defined space may be configured to hold a volume of electrolyte solution to supply HHO gas to a truck for at least 30,000 miles of driving. In certain embodiments, for example, the first defined space may be configured to hold a volume of electrolyte solution to supply HHO gas to a truck for at least 400,000 crankshaft rotations, for example at least 800,000 crankshaft rotations, at least 1,600,000 crankshaft rotations, at least 2,400,000 crankshaft rotations, at least 10,000,000 crankshaft rotations, at least 20,000,000 crankshaft rotations, at least 40,000,000 crankshaft rotations, or the first defined space may be configured to hold a volume of electrolyte solution to supply HHO gas to a truck for at least 60,000,000 crankshaft rotations.

In certain embodiments, the second defined space may not be integrated into the high-pressure container where the HHO gas generator is housed. The second defined space may be a separate high-pressure housing configured to receive HHO gas or be detachably connected to the HHO generator (for example for remote or portable delivery). In certain embodiments, the separate second defined space may serve as an additional storage of HHO gas, a primary storage or secondary storage for HHO gas. In certain embodiments, for example, the solution may comprise water and one or more electrolytes. In certain further embodiments, for example, the one or more electrolytes may comprise a metal salt, such as a metal salt at least partially soluble in water. In certain embodiments, for example, the one or more electrolytes may be selected from the group consisting of: $KOH$, $NaOH$, $N_{a2}CO_3$, $NaHCO_3$, $NaCl$, $K_2OO_3$, $KHCO_3$, $H_2SO_4$, $CH_3COOH$, and a combination of two or more thereof.

In certain embodiments, for example, the first defined space may be configured to hold at least 1-quart of the electrolyte solution, for example at least ½ gallon, at least 1 gallon, or the first defined space may be configured to hold at least 5 gallons of the electrolyte solution.

In certain embodiments, for example, the electrolyte solution may comprise an aqueous solution with a concentration of one or more electrolytes of less than 5 vol. % (in total) relative to the total volume of the electrolyte solution, for example less 4 vol. %, less than 3 vol. %, less than 2 vol. %, less than 1 vol. %, less than 0.5 vol. %, or the electrolyte solution may comprise an aqueous solution with a concentration of one or more electrolytes of less than 0.25 vol. % (in total) relative to the total volume of the electrolyte solution. In certain embodiments, for example, the electrolyte solution may comprise an aqueous solution with a concentration of one or electrolytes in the range of 0.1-5 vol. %, for example in the range of 0.5-3 vol. % or the electrolyte solution may comprise an aqueous solution with a concentration of electrolyte in the range of 1.5-3 vol. % (in total) relative to the total volume of the electrolyte solution. In certain embodiments, for example, the one or more electrolytes may be selected from the group consisting of: KOH, NaOH, $Na_2CO_3$, $NaHCO_3$, NaCl, $K_2CO_3$, $KHCO_3$, $H_2SO_4$, $CH_3COOH$, and a combination of two or more thereof. In certain further embodiments, for example, the electrolysis cell may comprise an electrolyte solution, wherein the concentration of one or more electrolytes present in the electrolyte solution may be selected, maintained, and/or adjusted to provide a current draw of less than 20 amps (for example less than 10 amps) at the operating voltage and temperature of the electrolysis cell. In certain further embodiments, for example, the electrolyte concentration may be lower than the concentration of electrolyte a conventional electrolysis cell. In certain embodiments, for example, the electrolyte solution may be exclusive of sulfuric acid. In certain embodiments, for example, the electrolysis cell may be operated continuously (for example without pulsed width modulation) for a period of time (for example at least 10 minutes, at least 30 minutes, at least 1 hour, or indefinitely) without overheating, for example without heating to a temperature in excess of 65° C. In certain further embodiments, for example, an ability to operate the electrolysis cell continuously without overheating may be due at least in part to a low electrolyte concentration in the electrolyte solution and/or a current draw of less than 15 amps (for example less than 10 amps).

In certain embodiments, for example, the electrolysis cell may further comprise a plurality of electrolysis plates. In certain further embodiments, for example, the plurality of electrolysis plates may comprise in the range of 5-15 plates, for example in the range of 7-12 plates, or the plurality of electrolysis plates may comprise in the range of 5-8 plates.

In certain embodiments, for example, each of the plurality of electrolysis plates may have a thickness in the of 0.25-3 mm, for example in the range of 0.5-2.5 mm, or the plurality of electrolysis plates may have a thickness in the of 1-2 mm.

In certain embodiments, for example, a first one of the plurality of electrolysis plates may be disposed at a distance in the range of 0.25-8 mm from a second adjacent one of the plurality of plates, for example a first one of the plurality of electrolysis plates may be disposed at a distance in the range of 0.5-3 mm from a second adjacent one of the plurality of plates.

In certain embodiments, for example, the plates may comprise (for example be composed of or be partially or completely coated with) a material that is composed of or comprises a highly conductive and low corrosivity material, for example a material with a higher conductivity higher than 304 stainless steel and a corrosivity in the electrolyte environment of about the same or less than 304 stainless steel. In certain embodiments, for example, at least a portion of at least one surface of at least one of the plurality of electrolysis plates may comprise platinum, titanium, iridium, brass, gold, nickel alloy, silver, graphene or a combination of one or more thereof.

In certain embodiments, for example, the plurality of plates may be configured as a stack of approximately parallel plates in fixed relation comprising two end plates and remaining plates spaced an approximately equal distance between adjacent plates. In certain further embodiments, for example, the positive terminal may be attached to one of the end plates and the negative terminal may be attached to the other of the end plates. In certain embodiments, for example, the plurality of electrolysis plates may be fully immersed in the electrolyte solution. In certain embodiments, for example, the positive terminal and the negative terminal may be in electrical and or electrochemical communication only or at least substantially through the plurality of plates and electrolyte solution present in the regions between adjacent plates. In certain embodiments, for example, electrical and/or electrochemical communication through the plurality of plates and electrolyte solution present in the regions between adjacent plates may be increased (for example maximized) by insulating a portion of the plurality of plates, for example by seating the stack of plates in a slot of the pressurized container and/or at least partially isolating the fluid situated between adjacent plates in a plate stack with spacers, gaskets, and or sealants between the adjacent plates.

In certain embodiments, for example, the electrolysis cell may comprise cooling coils in the first defined space, whereby heat may be removed from the electrolyte solution.

In certain embodiments, for example, the electrolysis cell may comprise a second defined space provisioned to contain and/or store HHO gas. In certain further embodiments, for example, the second defined space may contain and/or store air-free HHO gas. In certain embodiments, for example, the second defined space may have a volume of at least 1 quart, at least 2 quarts, at least 1 gallon, at least 2 gallons, at least 5 gallons, at least 10 gallons, or the second defined space may have a volume of at least 25 gallons. In certain embodiments, for example, the second defined space may have a volume of less than 1 gallon, less than 5 gallons, less than 10 gallons, or the second defined space may have a volume of less than 25 gallons. In certain embodiments, for example, the HHO gas may degrade, be changed, and/or be less effective (for example be at least partially reacted or quenched) by exposure to air. In certain embodiments, for example, the HHO may be stored air-free (or at least substantially air-free) for at least 2 weeks (for example at least 1 month) without any noticeable change in performance when used as a second fuel in the internal combustion engine. In certain embodiments, Certain embodiments may provide, for example, an apparatus for providing HHO gas for an internal combustion engine, comprising: an electrolysis cell for generating the HHO gas, and a gas flow regulator configured to start and stop a flow of the HHO gas from the electrolysis cell to a plurality of injectors of the internal combustion engine. In certain further embodiments, for example, a gas exiting the gas pressure regulator may be controlled to have a temperature of greater than 35° C., for example of greater than 40° C., of greater than 50° C., of greater than 60° C., or the gas exiting the gas pressure regulator may be controlled to have a temperature of greater than 70° C.

In certain further embodiments, for example, a gas exiting the gas pressure regulator may be controlled to have a temperature of less than 90° C., for example less than 80° C., less than 70° C., less than 60° C., or the gas exiting the gas pressure regulator may be controlled to have a temperature less than 45° C. In certain further embodiments, for example, a gas exiting the gas pressure regulator may be controlled to have a temperature in the range of 5-80° C., for example in the range of 10-80° C., in the range of 5-75° C., in the range of 10-70° C., in the range of 10-60° C., in the range of 10-55° C., in the range of 20-80° C., in the range of 10-80° C., of less than 90° C., for example less than 80°

C., less than 70° C., less than 60° C., or the gas exiting the gas pressure regulator may be controlled to have a temperature less than 45° C.

Certain embodiments may provide, for example, an apparatus for providing HHO gas for an internal combustion engine, comprising: an electrolysis cell for generating the HHO gas, and a gas distribution harness comprising a plurality of lances configured to deliver the HHO gas to a plurality of intake ports of the internal combustion engine. In certain embodiments, for example, the number of the plurality of lances may be equal to a number of the plurality of the injectors. In certain embodiments, for example, at least one lance of the plurality of lances may comprise at least one outlet, at least a second lance of the plurality of lances may comprise at least a second outlet, and at least a third lance of the plurality of lances may comprise at least a third outlet. In certain embodiments, for example, the at least one outlet may be positioned within 3 inches (for example within 1.5 inches, within 1 inch, within 0.5 inches, within 0.25 inches, within 0.125 inches, or the at least one outlet may be positioned within 0.1 inches) of a an air flow port of a cylinder of a plurality of cylinders of the internal combustion engine, the at least a second outlet may be positioned within 3 inches (for example within 1.5 inches, within 1 inch, within 0.5 inches, within 0.25 inches, within 0.125 inches, or the at least second outlet may be positioned within 0.1 inches) of an air flow port of a second cylinder of the plurality of cylinders, and the at least a third outlet may be positioned within 3 inches (for example within 1.5 inches, within 1 inch, within 0.5 inches, within 0.25 inches, within 0.125 inches, or the at a least third outlet may be positioned within 0.1 inches) of an air flow port of a third cylinder of the plurality of cylinders. In certain embodiments, for example, the at least one outlet may be positioned within 3 inches (for example within 1.5 inches, within 1 inch, within 0.5 inches, within 0.25 inches, within 0.125 inches, or the at least one outlet may be positioned within 0.1 inches) of an engine valve seat of a plurality of engine valve seats of the internal combustion engine, the at least a second outlet may be positioned within 3 inches (for example within 1.5 inches, within 1 inch, within 0.5 inches, within 0.25 inches, within 0.125 inches, or the at least a second outlet may be positioned within 0.1 inches) of a second engine valve seat of the plurality of engine valve seats, and the at least a third outlet may be positioned within 3 inches (for example within 1.5 inches, within 1 inch, within 0.5 inches, within 0.25 inches, within 0.125 inches, or the at least a third outlet may be positioned within 0.1 inches) of a third engine valve seat of the plurality of engine valve seats. In certain embodiments, for example, the at least one outlet may be positioned within 3 inches (for example within 1.5 inches, within 1 inch, within 0.5 inches, within 0.25 inches, within 0.125 inches, or the at least one outlet may be positioned within 0.1 inches) of an orifice of an intake value of a cylinder of a plurality of cylinders of the internal combustion engine, the at least a second outlet may be positioned within 3 inches (for example within 1.5 inches, within 1 inch, within 0.5 inches, within 0.25 inches, within 0.125 inches, or the at least second outlet may be positioned within 0.1 inches) of an orifice of an intake valve of a second cylinder of the plurality of cylinders, and the at least a third outlet may be positioned within 3 inches (for example within 1.5 inches, within 1 inch, within 0.5 inches, within 0.25 inches, within 0.125 inches, or the at least a third outlet may be positioned within 0.1 inches) of an orifice of an intake valve of a third cylinder of the plurality of cylinders.

Certain embodiments may provide, for example, an apparatus for providing HHO gas for an internal combustion engine, comprising: an electrolysis cell for generating the HHO gas, and a gas distribution harness comprising a plurality of lances configured to deliver the HHO gas to a plurality of intake ports of the internal combustion engine. In certain embodiments, for example, the number of the plurality of lances may be equal to a number of the plurality of the injectors. In certain embodiments, for example, at least one lance of the plurality of lances may comprise at least one outlet, at least a second lance of the plurality of lances may comprise at least a second outlet, and at least a third lance of the plurality of lances may comprise at least a third outlet. In certain embodiments, for example, the at least one outlet may be positioned within 3 cm (for example within 1.5 cm, within 1 cm, within 0.5 cm, within 0.25 cm, within 0.125 cm, or the at least one outlet may be positioned within 0.1 cm) of an air flow port of a cylinder of a plurality of cylinders of the internal combustion engine, the at least a second outlet may be positioned within 3 cm (for example within 1.5 cm, within 1 cm, within 0.5 cm, within 0.25 cm, within 0.125 cm, or the at least second outlet may be positioned within 0.1 cm) of an air flow port of a second cylinder of the plurality of cylinders, and the at least a third outlet may be positioned within 3 cm (for example within 1.5 cm, within 1 cm, within 0.5 cm, within 0.25 cm, within 0.125 cm, or the at a least third outlet may be positioned within 0.1 cm) of an air flow port of a third cylinder of the plurality of cylinders. In certain embodiments, for example, the at least one outlet may be positioned within 3 cm (for example within 1.5 cm, within 1 cm, within 0.5 cm, within 0.25 cm, within 0.125 cm, or the at least one outlet may be positioned within 0.1 cm) of an engine valve seat of a plurality of engine valve seats of the internal combustion engine, the at least a second outlet may be positioned within 3 cm (for example within 1.5 cm, within 1 cm, within 0.5 cm, within 0.25 cm, within 0.125 cm, or the at least a second outlet may be positioned within 0.1 cm) of a second engine valve seat of the plurality of engine valve seats, and the at least a third outlet may be positioned within 3 cm (for example within 1.5 cm, within 1 cm, within 0.5 cm, within 0.25 cm, within 0.125 cm, or the at least a third outlet may be positioned within 0.1 cm) of a third engine valve seat of the plurality of engine valve seats. In certain embodiments, for example, the at least one outlet may be positioned within 3 cm (for example within 1.5 cm, within 1 cm, within 0.5 cm, within 0.25 cm, within 0.125 cm, or the at least one outlet may be positioned within 0.1 cm) of an orifice of an intake value of a cylinder of a plurality of cylinders of the internal combustion engine, the at least a second outlet may be positioned within 3 cm (for example within 1.5 cm, within 1 cm, within 0.5 cm, within 0.25 cm, within 0.125 cm, or the at least second outlet may be positioned within 0.1 cm) of an orifice of an intake valve of a second cylinder of the plurality of cylinders, and the at least a third outlet may be positioned within 3 cm (for example within 1.5 cm, within 1 cm, within 0.5 cm, within 0.25 cm, within 0.125 cm, or the at least a third outlet may be positioned within 0.1 cm) of an orifice of an intake valve of a third cylinder of the plurality of cylinders.

Certain embodiments may provide, for example, a system for on-demand delivery of HHO gas for an internal combustion engine, comprising: an electrolysis cell for generating the HHO gas, a controller, and an HHO injection apparatus. In certain further embodiments, for example, the controller may adjust the injection of HHO gas when an exhaust temperature of the internal combustion engine exceeds one or more pre-determined temperatures. In certain further embodiments, the controller may adjust the injection of HHO gas when an exhaust temperature of the internal combustion engine exceeds 50° C., for example when the exhaust temperature exceeds 75° C., 100° C., 150° C., 175° C., or the controller may adjust the injection of HHO gas when an exhaust temperature of the internal combustion engine exceeds 200° C. In certain further embodiments, for example, the controller may increase the injection of HHO gas by in the range of 1-5 wt. % when an exhaust temperature of the internal combustion engine exceeds one or more of the foregoing pre-determined temperatures, for example the controller may increase the injection of HHO gas by in the range of 5-10 wt. %, increase the injection of HHO gas by in the range of 10-20 wt. %, increase the injection of HHO gas by in the range of 20-50 wt. %, increase the injection of HHO gas by in the range of 50-100 wt. %, increase the injection of HHO gas by in the range of 100-150 wt. %, or the controller may increase the injection of HHO gas by in the range of 150-200 wt. % when an exhaust temperature of the internal combustion engine exceeds one or more of the foregoing pre-determined temperatures Certain embodiments may provide, for example, a system for onboard, on-demand delivery of an HHO gas for an internal combustion engine (for example for a vehicle), comprising: an electrolysis cell configured to produce a required amount of HHO gas; and an HHO gas delivery system configured to distribute the HHO gas to the internal combustion engine. In certain embodiments, for example, distribution of the HHO gas may comprise delivering a portion of the required amount of HHO gas from the electrolysis cell to a position proximate an orifice (for example within 3 inches of the at least one orifice) of a combustion chamber intake valve, wherein said portion of the HHO gas is not introduced to or mixed with combustion intake air until said portion reaches said position and delivering a pre-determined amount of a portion of the HHO gas at a pre-determined time relative to the position of the piston operating within the combustion chamber and/or firing of that combustion chamber. In certain embodiments, for example, the internal combustion engine may provide power to a vehicle and the pre-determined amount of HHO gas may be generated by electrolyzing in the range of 2-30 ounces of electrolyte solution per 10,000 miles or per 20,000,000 crankshaft revolutions, for example in the range of 3-16 ounces of electrolyte solution, in the range of 4-10, or the required amount of HHO gas may be generated by electrolyzing in the range of 5-7 ounces (for example 6 ounces) of electrolyte solution per 10,000 miles or per 20,000,000 crankshaft revolutions. In certain embodiments, for example, the internal combustion engine may provide power to a vehicle and the required amount of HHO gas may be in the range of 300-1000 liters per 10,000 miles or per 20,000,000 crankshaft revolutions, based on a gas temperature of 25° C. and pressure of 1 atmosphere, for example in the range of 300-900 liters, in the range of 400-800 liters, in the range of 500-700 liters, or the required amount of HHO gas may be in the range of 600-700 liters per 10,000 miles or per 20,000,000 crankshaft revolutions, based on a gas temperature of 25° C. and pressure of 1 atmosphere.

In certain embodiments, for example, the required amount of HHO gas may be in the range of 1-10 liters per hour or per 120,000 crankshaft rotations, based on a gas temperature of 25° C. and pressure of 1 atmosphere, for example in the range of 2-7 liters, in the range of 3-4.5 liters, or the required amount of HHO gas may be in the range of 3.5-4.5 liters per hour or per 120,000 crankshaft rotations, based on a gas temperature of 25° C. and pressure of 1 atmosphere. In certain embodiments, for example, the foregoing ranges of the required amount of HHO gas may correspond to an average hourly requirement over typical driving conditions, for example an average hourly requirement over 10,000 miles or over 20,000,000 crankshaft rotations under typical driving conditions applicable to the vehicle.

In certain embodiments, for example, the required amount of HHO gas may be in the range of 1-10 liters per hour or per 120,000 crankshaft rotations, based on a gas temperature of within 20° C. of the temperature of engine coolant and a pressure of in the range of 40-50 psia, for example in the range of 1.5-6 liters, in the range of 2-4 liters, or the required amount of HHO gas may be in the range of 2-3 liters per hour or per 120,000 crankshaft rotations, based on a gas temperature of within 20° C. of the temperature of engine coolant and a pressure of in the range of 40-50 psia. In certain embodiments, for example, the foregoing ranges of the required amount of HHO gas may correspond to an average hourly requirement over typical driving conditions, for example an average hourly requirement over 10,000 miles or over 20,000,000 crankshaft rotations under typical driving conditions applicable to the vehicle.

Certain embodiments may provide, for example, a system for onboard, on-demand delivery of an HHO gas for an internal combustion engine for a vehicle, comprising: an electrolysis cell capable of delivering a required amount of HHO gas of at least 1 liter of HHO. In certain embodiments, for example, the electrolysis cell may be capable of delivering at least 1.5 liters of HHO gas for every 120,000 revolutions of the crankshaft of the engine, for example at least 2 liters, at least 3 liters, at least 4 liters, at least 5 liters, at least 6 liters, at least 7 liters, at least 10 liters, at least 20 liters, or the electrolysis cell may be capable of delivering at least 30 liters of HHO gas for every 120,000 revolutions of the crankshaft of the engine. In certain embodiments, for example, the electrolysis cell may be capable of delivering in the range of 1-10 liters of HHO gas for every 120,000 revolutions of the crankshaft of the engine, for example in the range of 1-8 liters of HHO gas, in the range of 2-7 liters of HHO gas, or the electrolysis cell may be capable of delivering in the range of 2-5 liters of HHO gas for every 120,000 revolutions of the crankshaft of the engine. In certain embodiments, for example, any of the above values and/or ranges of the required amount may be based on the volume of HHO gas delivered from an electrolysis cell at the outlet pressure of the electrolysis cell (for example 45-50 psia). In certain embodiments, for example, any of the above values and/or ranges of the required amount may be based on a volume of HHO gas as calculated at a standard temperature and pressure (for example, a standard temperature of 25° C. and a standard pressure of 1 atmosphere). In certain embodiments, for example, any of the above values and/or ranges of the required amount may be based on the volume of the HHO gas at the outlet temperature and pressure of an engine coolant-cooled flow regulator in communication with at least one HHO gas injector (for example an outlet temperature within 20° C. of the temperature of engine coolant entering the flow regulator and a pressure of 45 psi above an inlet air pressure of the internal combustion engine.

In certain embodiments, for example, the electrolysis cell may store a volume of HHO gas sufficient to deliver the required amount of HHO gas for at least 5,000 crankshaft revolutions of the internal combustion engine, for example at least 10,000 crankshaft revolutions, 15,000 crankshaft revolutions, 20,000 crankshaft revolutions, or the electrolysis cell may store a volume of HHO gas sufficient to deliver the required amount of HHO gas for at least 50,000 crankshaft revolutions of the internal combustion engine. In certain further embodiments, for example, the temperature of the electrolysis cell may not exceed 80° C. during operation, for example the temperature of the electrolysis cell may not exceed may not exceed 65° C. during operation. In certain embodiments, for example, the temperature of the electrolysis cell may not exceed 25° C. above ambient temperature.

In certain embodiments, for example, the electrolysis cell may be powered by a DC power source having a voltage in the range of 11-30 VDC, for example 11-14 VDC, the electrolysis cell may be powered by a DC power source having a voltage in the range of 20-28 VDC. In certain embodiments, for example, the electrolysis cell may be powered by a DC power source having a voltage of 24 VDC, or the electrolysis cell may be powered by a DC power source having a voltage of 28 VDC.

In certain further embodiments, for example, the electrolysis cell may comprise an electrolyte solution, wherein the concentration of electrolyte present in the electrolyte solution may be selected, maintained, and/or adjusted to provide a current draw of less than 20 amps, 15 amps, or less than 10 amps at the operating temperature of the electrolysis cell. In certain embodiments, for example, the electrolysis cell may be configured to operate on less than 250 watts of DC power, for example the electrolysis cell may be configured to operate on less than 150 watts of DC power. In certain embodiments, for example, the electrolysis cell may be configured to have less than 20 ohm of resistance, for example less than 10 ohm, less than 5 ohm, or the electrolysis cell may be configured to have less than 3 ohm of resistance. In certain embodiments, for example, the electrolysis cell may be configured to have at least 1 ohm of resistance, for example at least 2 ohm, at least 3 ohm, at least 5 ohm, at least 10 ohm, at least 20 ohm, or the electrolysis cell may be configured to have at least 30 ohm of resistance.

Certain embodiments may provide, for example, a method, apparatus, or system to deliver HHO gas into one or more cylinders of an internal combustion engine. In certain embodiments, for example, less than 0.05 liter of the HHO gas per liter of cylinder displacement may be delivered to each of the one or more cylinders at a pressure of less than 300 kPa (for example less than 200 kPa, less than 150 kPa, or less than 110 kPa), less than 0.025 liter of the HHO gas per liter of cylinder displacement may be delivered to each of the one or more cylinders at a pressure of less than 300 kPa (for example less than 200 kPa, less than 150 kPa, or less than 110 kPa), less than 0.01 liter of the HHO gas per liter of cylinder displacement may be delivered to each of the one or more cylinders at a pressure of less than 300 kPa (for example less than 200 kPa, less than 150 kPa, or less than 110 kPa), or less than 0.005 liter of the HHO gas per liter of cylinder displacement may be delivered to each of the one or more cylinders at a pressure of less than 300 kPa (for example less than 200 kPa, less than 150 kPa, or less than 110 kPa).

Certain embodiments may provide, for example, method for reducing one or more emissions of an internal combustion engine, comprising: controlling a temperature of an HHO gas by exchanging heat with an engine coolant; and delivering an HHO gas at the controlled temperature to at least one intake port of the internal combustion engine. In certain embodiments, one or more than one (including for instance all) of the following embodiments may comprise each of the other embodiments or parts thereof. In certain embodiments, for example, one or more engine-out emissions of the internal combustion engine may fall within or meet one or more regulated emission limits for the internal combustion engine according to one or more emission standards specified in Europe (for example the Euro I, Euro II, Euro III, Euro IV, Euro V, or Euro VI emission standards) and/or by the Environmental Protection Agency (for example the 2002, 2004, 2007, 2010, or 2014 Environmental Protection Agency emission standards).

In certain embodiments, for example, the one or more engine-out emissions may be particulate matter (PM) emissions, nitrogen oxide (NOx) emissions, nitric oxide (NO) emissions, nitrogen dioxide ($NO_2$) emissions, hydrocarbon (HC) emissions, total hydrocarbon (THC) emissions, non-methane hydrocarbon (NMHC) emissions, hydrocarbon and nitrogen oxide (HC+NOx) emissions, nitrogen oxide and non-methane hydrocarbon (NOx+NMHC) emissions, carbon oxide (CO) emissions, carbon dioxide ($CO_2$) emissions, fine particle ($PM_{2.5}$) emissions, ultrafine particle ($PM_{0.1}$) emissions, number of particles (PN) emissions, non-methane organic gases (NMOG) emissions, formaldehyde (HCHO) emissions, or a combination of one or more of the foregoing emissions.

In certain embodiments, for example, one of the one or more regulated emission limits may be based on one or more test procedures. In certain embodiments, for example, the one or more test procedures may be the Federal Test Procedure (FTP), the Environmental Protection Agency Transient Test Procedure, the Not-to-Exceed (NTE) test, the Supplemental Emission Test (SET), the Urban Dynamometer Driving Schedule (UDDS), the FTP 72 cycle, the FTP 75 cycle, the Urban Dynamometer Driving Schedule (UDDS), the US06 test or Supplemental Federal Test Procedure (SFTP), the LA92 "Unified" Dynamometer Driving Schedule, the New European Driving Cycle test (NEDC), the Extra Urban Driving Cycle (EUDC), the ECE Urban Driving Cycle, the Common Artemis Driving Cycles (CADC), the ADAC Highway Cycle, the RTS 95 Cycle, the ECE R49 cycle, the ESC (OICA) cycle, the ELR cycle, the ETC (FIGE) cycle, the Exhaust Emission Standards for Nonroad Compression-Ignition Engines, according to 40 C.F.R. Part 89 Subpart E, according to 40 C.F.R. Part 1039 Subpart F, or a combination of two or more thereof.

In certain embodiments, for example, one of the one or more regulated emission limits may be a PM level of less than 1.0 grams per kilowatt-hour (g/kW-hr), for example a PM level of less than 0.02 g/kW-hr. In certain embodiments, for example, one of the one or more regulated emission limits may be a PM level of less than 0.25 grams per kilometer (g/km), for example a PM level of less than 0.005 g/km. In certain embodiments, for example, one of the one or more regulated emission limits may be a NOx level of less than 15.8 g/kWh, for example a NOx level of less than 0.268 g/kWh. In certain embodiments, for example, one of the one or more regulated emission limits may be a NOx level of less than 0.78 g/km, for example a NOx level of less than 0.012 g/km. In certain embodiments, for example, one of the one or more regulated emission limits may be an HC level of less than 2.6 g/kWh, for example an HC level of less than 0.13 g/kWh. In certain embodiments, for example, one of the one or more regulated emission limits may be a THC level of less than 0.29 g/km a THC level of less than 0.10 g/km. In certain embodiments, for example, one of the one or more regulated emission limits may be an NMHC level of less than 1.3 g/kW-hr, for example an NMHC level of less than 0.19 g/kW-hr. In certain embodiments, for example, one of the one or more regulated emission limits may be an NMHC level of less than 0.108 g/km, for example an NMHC level of less than 0.068 g/km. In certain embodiments, for example, one of the one or more regulated emission limits may be an NMHC+NOx level of less than 21.4 g/kW-hr, for example an NMHC+NOx level of less than 4.0 g/kW-hr. In certain embodiments, for example, one of the one or more regulated emission limits may be an HC+NOx level of less than 1.7 g/km, for example an HC+NOx level of less than 0.170 g/km. In certain embodiments, for example, one of the one or more regulated emission limits may be a CO level of less than 53.6 g/kW-hr, for example a CO level of less than 1.0 g/kW-hr. In certain embodiments, for example, one of the one or more regulated emission limits may be a CO level of less than 6.9 g/km, for example a CO level of less than 0.50 g/km. In certain embodiments, for example, one of the one or more regulated emission limits may be a NMOG level of less than 0.28 g/mi, for example a NMOG level of less than 0.01 g/mi. In certain embodiments, for example, one of the one or more regulated emission limits may be an HCHO level of less than 0.032 g/mi, for example an HCHO level of less than 0.004 g/mi. In certain embodiments, for example, one of the one or more regulated emission limits may be a PN level of less than $6*10^{12}$, for example a PN level of less than $6*10^{11}$.

Certain embodiments may provide, for example, a method of delivering HHO gas to a combustion chamber of an internal combustion engine. In certain embodiments, for example, the HHO gas may be delivered at a controlled temperature. In certain further embodiments, for example, the controlled temperature may be within 20° C. of an engine coolant temperature (for example the temperature of an inlet coolant supplied to an inlet side of a heat exchanger positioned upstream of the combustion chamber, such as positioned proximate a regulator for HHO gas flow into the combustion chamber), for example the temperature may be within 15° C., within 10° C., or the controlled temperature may be within 5° C. of an engine coolant temperature. In certain further embodiments, for example, the controlled temperature may be no more than 20° C. above an engine coolant temperature (for example the temperature of an inlet coolant supplied to an inlet side of a heat exchanger), for example the temperature may be no more than 15° C., no more than 10° C., or the controlled temperature may be no more than 5° C. above an engine coolant temperature. In certain further embodiments, for example, the controlled temperature may be no more than 20° C. below an engine coolant temperature (for example the temperature of an inlet coolant supplied to an inlet side of a heat exchanger), for example the temperature may be no more than 15° C., no more than 10° C., or the controlled temperature may be no more than 5° C. below an engine coolant temperature.

In certain embodiments, for example, the HHO gas may be under pressure when introduced to an internal combustion engine. In certain embodiments, for example, the HHO gas may be introduced at a pressure in the range of 50-500 kPa above the pressure of an intake port of the combustion chamber of the internal combustion engine, for example in the range of 50-300 kPa above the pressure of an intake port, in the range of 100-200 kPa, in the range of 45-50 psi, or the HHO gas may be introduced at a pressure in the range of 100-150 kPa above the pressure of an intake port of the combustion chamber.

In certain embodiments, for example, the HHO gas may be introduced at a pressure in the range of 45-50 psi above the pressure of an intake port combustion chamber and at a temperature within 30° C. of an inlet coolant supplied to an inlet side of a heat exchanger. In certain embodiments, for example, use of the engine coolant to control the temperature of the HHO gas and/or controlling the introduction pressure of the HHO gas (for example by using a pressure regulator) may allow pre-determined amounts of the HHO gas to be introduced to the internal combustion engine. In certain embodiments, for example, the aforesaid temperature and/or pressure controls may provide more precise control over the amount of HHO gas introduced into the internal combustion engine in comparison to a system lacking said controls (for example a traditional system for introducing electrolysis gases into an internal combustion engine).

Certain embodiments may provide, for example, apparatus, methods, or systems to improve the performance of an internal combustion engine. In certain embodiments, for example, the internal combustion engine may include gasoline engines, diesel engines, turbocharged diesel engines, supercharged diesel engines, direct injection diesel engines, trunk-piston diesel engines, crosshead diesel engines, marine diesel engines, locomotive diesel engines, low-speed diesel engines, medium-speed diesel engines, high-speed diesel engines, double-acting diesel engines, 2-stroke engines, 4-stroke engines and combinations thereof. In certain embodiments, for example, internal combustion engines may realize a fuel economy increase of at least 1%, for example at least 2%, at least 3%, at least 4%, at least 5%, at least 10%, at least 15%, at least 20%, at least 25%, at least 30%, at least 35%, at least 40%, at least 45%, at least 50%, or more. In certain embodiments, for example, the fuel economy increase may be in the range of between 1-50%, for example between 1-5%, between 5-10%, between 5-25%, between 7-12%, between 10-20%, between 15-25%, between 20-25%, between 20-30%, between 20-50%, between 30-35%, between 30-38%, between 40-50%, between 40-45%, or between 44-50%.

In certain embodiments, for example, internal combustion engines may realize a fuel economy increase of at least 1%, for example at least 2%, at least 3%, at least 4%, at least 5%, at least 10%, at least 15%, at least 20%, at least 25%, at least 30%, at least 35%, at least 40%, at least 45%, at least 50%, or more. In certain embodiments, for example, the fuel economy increase may be in the range of between 1-50%, for example between 1-5%, between 5-10%, between 5-25%, between 7-12%, between 10-20%, between 15-25%, between 20-25%, between 20-30%, between 20-50%, between 30-35%, between 30-38%, between 40-50%, between 40-45%, or between 44-50%.

Certain embodiments may provide, for example, apparatus, methods, or systems to achieve substantially complete combustion, or at least more complete combustion, within the internal combustion engine. In certain embodiments, for example, more complete combustion may be more than 10%, for example more than 20%, more than 30%, more than 40%, more than 50%, more than 60%, more than 70%, more than 80%, more than 90%, or more than 99% combustion of the hydrocarbon fuel provided to the internal combustion engine. In certain embodiments, for example, substantially complete combustion may be more than 80%, for example more than 85%, more than 90%, more than 95%, more than 96%, more than 97%, more than 98%, or more than 99% combustion of the hydrocarbon fuel provided to the internal combustion engine.

Certain embodiments may provide, for example, apparatus, methods, or systems to improve the operation of the internal combustion engine. In certain embodiments, one or more than one (including for instance all) of the following embodiments may comprise each of the other embodiments or parts thereof. In certain embodiments, for example, the internal combustion engine may operate at a cooler temperature and/or may run cleaner. In certain embodiments, for example, the internal combustion engine may generate more power for the same or lower amount of fuel. In certain embodiments, for example, the internal combustion engine may generate exhaust temperatures more suitable for efficient operation of exhaust aftertreatment systems. In certain embodiments, for example, the internal combustion engine may generate exhaust temperatures more suitable for efficient operation of diesel particulate filter (DPF). In certain embodiments, for example, the internal combustion engine may generate exhaust temperatures more suitable for efficient operation of selective catalytic reactor (SCR). In certain embodiments, for example, the internal combustion engine may generate exhaust temperatures more suitable for efficient operation of diesel oxidation catalyst (DOC). In certain embodiments, for example, the internal combustion engine may generate exhaust temperatures more suitable for efficient operation of NOx trap.

Certain embodiments may provide, for example, apparatus, methods, or systems to introduce a second fuel (for example a second fuel exclusive of a petroleum-derived fuel) into an internal combustion engine. In certain embodiments, for example, the second fuel (or booster gas or enhancement gas) comprises hydrogen, oxygen and/or mixtures thereof. In certain embodiments, for example, the second fuel may substantially comprise hydrogen, oxygen and/or mixtures thereof. In certain embodiments, for example, the second fuel may predominantly comprise hydrogen, oxygen and/or mixtures thereof. In certain embodiments, for example, the second fuel may be a product of electrolysis.

Certain embodiments may provide, for example, apparatus, methods, or systems to produce an oxygen-hydrogen gas mixture (for example an oxygen-hydrogen gas mixture for use as a second fuel in an internal combustion engine). In certain embodiments, for example, the gas mixture may be an oxygen-rich or hydrogen-rich a gas mixture. In certain embodiments, for example, the gas mixture may comprise at least one or more of the following aqueous solution electrolysis components: monatomic oxygen, diatomic oxygen, monatomic hydrogen, diatomic hydrogen, hydrogen ions, oxygen ions, mononuclear oxygen, mononuclear ozone, singlet oxygen, hydroxide ions, hydronium ions, superoxide, hydrogen superoxide, hydroxide radical, peroxide radical, ionic peroxide, combinations of one or more of these and/or mixtures of the same. In certain embodiments, for example, in exemplary embodiments, the gas mixture may be a gas mixture comprising at least hydrogen ions and oxygen ions, or diatomic oxygen and diatomic hydrogen, or oxygen ion and diatomic oxygen, etc.

Certain embodiments may provide, for example, apparatus, methods, or systems to produce a gas mixture that is approximately two parts hydrogen to one part oxygen (for example 2:1) or less than 2:1 (for example 1.75:1, 1.5:1, 1.25:1, 1:1, 0.75:1, or 0.5:1). In certain embodiments, for example, the gas mixture produced may be modified before being delivered to the internal combustion engine. In certain embodiments, for example, the gas mixture may be combined with an additive and/or the composition of the gas mixture may be modified by adding, recycling or removing portions of the gas mixture. In certain embodiments, for example, the electrolysis process may generate a hydrogen to oxygen ratio of between 1.8:1 to 2.3:1, for example a hydrogen to oxygen ratio of 2:1 and the system may be configured to deliver a gas mixture having a hydrogen to oxygen ratio of less than 2:1, for example a hydrogen to oxygen ratio of 1.8:1 or less, such as 1.7:1 or less, 1.5:1 or less, 1.3:1 or less, by removing, or recycling, a portion of the hydrogen from the gas mixture prior to delivery. Alternatively, in certain embodiments, for example, an apparatus, method, or system may generate hydrogen and oxygen at a hydrogen to oxygen ratio of 2:1, but some of the hydrogen or oxygen, for example oxygen, may be trapped in bubbles, and the apparatus, method, or system may be configured to release the trapped oxygen to effectively deliver more oxygen to the internal combustion engine.

Certain embodiments may provide, for example, apparatus, methods, or systems to produce a gas mixture that is approximately two parts oxygen to one part hydrogen (for example 2:1) or less than 2:1 (for example 1.75:1, 1.5:1, 1.25:1, 1:1, etc.). In certain embodiments, for example, the electrolysis process may generate an oxygen to hydrogen ratio of between 1.8:1 to 2.3:1, for example an oxygen to hydrogen ratio of 2:1 ratio, and the system may be configured to deliver a gas mixture having an oxygen to hydrogen ratio of less than 2:1, for example an oxygen to hydrogen ratio of 1.8:1 or less, 1.7:1 or less, 1.5:1 or less, 1.3:1 or less by removing, adding or recycling a portion of the hydrogen or oxygen from the gas mixture prior to delivery. In certain embodiments, for example, the system may generate an oxygen to hydrogen ratio of less than 3.5:1, less than 3:1, less than 2.75:1, less than 2.5:1.

Certain embodiments may provide, for example, apparatus, methods, or systems to result in a more reliably controlled gas mixture generation process. In certain embodiments, for example, the current provided to the system for gas generation may be continually or continuously regulated or controlled, for example, in real time (or substantially real time), so as to provide predetermined or controlled quantity of gas, for example, in relation to the engine speed and/or demand.

Certain embodiments may provide, for example, apparatus, methods, or systems to utilize a substantially closed-loop system that recycles a water-reagent (or water-electrolyte or aqueous solution electrolysis component) mixture in an effort to reduce its consumption.

Certain embodiments may provide, for example, apparatus, methods, or systems to alter combustion (for example diesel combustion) chemistry to reduce particulate formation. In certain embodiments, for example, internal combustion engines may realize a reduction in particulate formation of greater than 5%, greater than 10%, greater than 15%, greater than 20%, greater than 25%, greater than 30%, greater than 35%, greater than 40%, greater than 50%, greater than 60%, greater than 75%, greater than 80%, greater than 90%, greater than 95% or close to 100%.

Certain embodiments may provide, for example, apparatus, methods, or systems to increase the concentration of an oxidizer in an internal combustion engine. In certain embodiments, for example, the increase in the amount of oxidizers may be at least 5%, at least 10%, at least 15%, at least 20%, at least 25%, at least 30%, at least 35%, at least 40%, at least 45%, or at least 50%. In certain embodiments, for example, the increase in the amount of oxidizers may be between 5-50%, such as between 10-20%, between 15-25%, between 20-30%, between 25-35%, between 30-40%, between 35-45%, or between 40-50%.

Certain embodiments may provide, for example, apparatus, methods, or systems that serve as a mechanism for distributing the oxidizer for more even air/fuel mixture.

Certain embodiments may provide, for example, apparatus, methods, or systems to generate a gas mixture that is an accelerant to speed combustion, enhance combustion, and/or increase the extent of combustion.

Certain embodiments may provide, for example, apparatus, methods, or systems to displace air with oxygen and/or hydrogen within the engine's intake system. In certain embodiments, one or more than one (including for instance all) of the following embodiments may comprise each of the other embodiments or parts thereof. In certain embodiments, for example, an apparatus, method, or system may displace air within the engine's intake system with the gas mixture, resulting from the gas mixture generator system. In certain embodiments, for example, an apparatus, method, or system may be used to create a shorter combustion process that lowers the engine temperature thereby reducing the formation of nitrogen oxides. In certain embodiments, for example, an apparatus, method, or system may generate a gas mixture resulting from electrolysis of an aqueous solution and introducing at least a portion of the gas mixture into the engine's intake for improved combustion. In certain embodiments, for example, an apparatus, method, or system may generate a gas mixture resulting from electrolysis of an aqueous solution and introducing a substantial portion (for example greater than 95 wt. %), of the gas mixture into the engine's intake for improved combustion. In certain embodiments, for example, an apparatus, method, or system may generate a gas mixture resulting from electrolysis of an aqueous solution and storing the gas mixture in a storage tank instead of introducing the gas mixture into the engine's intake. In certain embodiments, for example, an apparatus, method, or system may generate an optimized or partially optimized quantity of a gas mixture, such as a gas mixture having one or more aqueous solution electrolysis components, into the engine's intake for improved combustion. In certain embodiments, for example, an apparatus, method, or system may be configured to produce in the range of between 1-7.5 liters of gas per minute, such as 1.2, 1.7, 2.0, 2.9, 3.5, 5.0, or 7.0 liters of gas per minute, and/or produce in the range of between 0.08-0.75 liters of gas per minute per liter of engine displacement, such as 0.1, 0.12, 0.17, 0.20, 0.25, 0.29, 0.3, 0.32, 0.35, 0.4, 0.45, 0.50, 0.6, or 0.70 liters of gas per minute per liter of engine displacement. In certain embodiments, for example, an apparatus, method, or system may be configured to produce in the range of between 0.25-3 liters of gas per minute, such as between 0.25-2.5, between 0.25-2, between 0.25-1.5, between 0.25-1, between 0.25-0.50, between 0.50-0.75, between 0.5-2.5, between 0.5-1.5, between 0.75-1, between 1-2, between 1-3, between 1-1.5, between 1.25-1.75, between 1.5-2, between 2-2.5, between 2.5-3 liters of gas per minute.

Certain embodiments may provide, for example, a system or apparatus to generate a gas mixture for use with an internal combustion engine, the system or apparatus comprising a tank configured to store an aqueous solution consisting essentially of water and a predetermined quantity of electrolyte (reagent). In certain embodiments, one or more than one (including for instance all) of the following embodiments of the system or apparatus may comprise each of the other embodiments or parts thereof. In certain embodiments, for example, the system or apparatus may further comprise a cell (i.e., an electrolytic cell) configured for aiding in the electrolysis of the aqueous solution. In certain further embodiments, for example, the cell may comprise a plurality of plates arranged substantially parallel to one another and be spaced substantially equidistant from an adjacent one of the plurality of plates, and at least one seal located between the plurality of plates. In certain embodiments, for example, the at least one seal may comprise a relatively hard plastic portion with a first thickness for maintaining the predetermined distance between adjacent plates, and a relatively soft sealing portion, typically, a soft, often rubber or rubber-like portion, with a second thickness for maintaining the substantially airtight and substantially watertight seal between adjacent ones of the plurality of plates.

In certain embodiments, for example, the system or apparatus may further comprise a controller configured to apply a pulse width modulated voltage to the cell to generate the gas mixture within the cell. In certain further embodiments, for example, the controller may be configured to regulate the current provided to the cell by controlling the duty cycle of the pulse width modulated voltage. In certain embodiments, for example, the duty cycle may be controlled in real time and/or substantially real time.

In certain embodiments, for example, the system or apparatus may further comprise an output for outputting the gas mixture to the internal combustion engine.

In certain embodiments, for example, the gas mixture may be input into the tank prior to being output to the internal combustion engine. In certain embodiments, for example, the gas mixture may be output to the internal combustion engine without being input into the tank. In certain embodiments, for example, the gas mixture may be stored in the tank without being output to the internal combustion engine under certain operating conditions. In certain embodiments, for example, the gas generation system or apparatus may be integral with the gas storage tank.

In certain embodiments, for example, the tank may be manufactured of a material that is non-conductive.

In certain embodiments, for example, the electrolyte may be a metal salt, such as a metal salt at least partially soluble in water. In certain embodiments, for example, the electrolyte may be one selected from the group consisting of: KOH, NaOH, $Na_2CO_3$, $NaHCO_3$, NaCl, $K_2CO_3$, $KHCO_3$, $H_2SO_4$, $CH_3COOH$, and a combination of two or more thereof.

In certain embodiments, for example, the size of the tank may be selected such that the aqueous solution occupies less than ¼, ⅓, ½, ⅔, or ¾, the volume of the tank during operation. In certain embodiments, for example, the tank may have a capacity of 2, 3, 4, 5, 6, 7, 8, 9, or 10 liters. In certain embodiments (for example for larger applications), for example, the tank may be even larger. In certain embodiments, for example, the system or apparatus may comprise multiple tanks.

In certain embodiments, for example, the cell may comprise at least two plates, a first plate configured to be coupled to a positive terminal of a voltage source and a second plate configured to be coupled to a negative terminal of the voltage source. In certain embodiments, for example, the cell may further comprise at least one neutral plate configured in a series relationship to the first plate and the second plate. In certain embodiments, for example, the cell may comprise at least 2, at least 3, at least 4, at least 5, at least 6, at least 7, at least 8, at least 9, at least 10, at least 11, at least 12, at least 13, at least 14, or at least 15 neutral plates. In certain embodiments, for example, the number of neutral plates may be selected to obtain a desired voltage drop between the plates.

In certain embodiments, for example, the soft rubber portion of the at least one seal may be positioned on an inner edge of the hard plastic portion of the seal.

In certain embodiments, for example, the soft rubber portion may be located on the outer edge of hard plastic portion. In certain embodiments, for example, the seal may comprise at least two soft plastic portions—a first soft plastic portion may be located between the interface of the hard plastic portion and a first one of the adjacent plates and a second soft plastic portion may be located between the interface of the hard plastic portion and a second one of the adjacent plates. In certain embodiments, for example, the soft plastic portion may surround the hard plastic portion of the seal. In certain embodiments, for example, the thickness of the soft rubber portion may be larger than the thickness of the hard plastic portion of the seal. In certain embodiments, for example, the hard plastic portion may be 0.002", 0.003", 0.004", 0.005", 0.006"', 0.007", 0.008", 0.009", 0.010", 0.0125", 0.025", 0.0375", 0.050", 0.0625", or 0.075" thick. In certain embodiments, for example, the soft rubber portion may be 0.002", 0.003", 0.004", 0.005", 0.006", 0.007", 0.008", 0.009", 0.010", 0.011", 0.012", 0.13", 0.014", 0.030", 0.038", 0.055", 0.0675", or 0.080" thick. In certain embodiments, for example, the hard plastic portion may be manufactured from a material selected such that the hard plastic portion does not significantly react with the aqueous solution. In certain embodiments, for example, the hard plastic portion may be manufactured from high density polyethylene (HDPE), polyphthalamide (PPA), styrene, nylon, or combinations thereof. In certain embodiments, for example, the soft rubber portion may be manufactured from a material selected such that the soft rubber portion does not significantly react with the aqueous solution. In certain embodiments, for example, the soft rubber portion may be manufactured from ethylene propylene diene monomer (EPDM).

In certain embodiments, for example, the internal combustion engine may be a turbocharged diesel engine and the gas mixture may be input into the turbocharged diesel engine up stream of an intake valve or valves. In certain embodiments, for example, the internal combustion engine may comprise a nonroad engine, a stationary engine, a locomotive engine, a marine engine, an aircraft engine, or a generator set engine. In certain embodiments, for example, the internal combustion engine may comprise a spark-ignition engine, a compression-ignition engine, a naturally aspirated engine, a turbocharged engine, a turbocompound engine, a supercharged engine, a direct injection engine, an indirect injection engine, or a port injection engine. In certain embodiments, for example, the internal combustion engine may comprise a gasoline engine, a diesel engine, an ethanol engine, a methanol engine, a biofuel engine, a natural gas engine, a propane engine, or an alternative fuel engine.

In certain embodiments, for example, the scrubber may comprise a switch configured to sense excess liquid and/or moisture in the form of foam in the gas stream and shut-off the electrolysis process to prevent the excess moisture from entering the internal combustion engine, and/or the accumulation of the gas mixture.

Certain embodiments may provide, for example, apparatus, methods, or systems to realize a fuel economy increase of at least 1%, for example at least 2%, at least 5%, at least 10%, at least 15%, at least 20%, at least 25%, at least 30%, at least 35%, at least 40%, at least 45%, at least 50%, or more. In certain embodiments, for example, the fuel economy increase may be in the range of between 1-50%, for example between 1-5%, between 5-10%, between 5-25%, between 7-12%, between 10-20%, between 15-25%, between 20-25%, between 20-30%, between 20-50%, between 30-35%, between 30-38%, between 40-50%, between 40-45%, or between 44-50%.

Certain embodiments may provide, for example, apparatus, methods, or systems to improve the operation of an internal combustion engine. In certain embodiments, for example, the internal combustion engine may operate at a cooler temperature and/or may run cleaner.

Certain embodiments may provide, for example, apparatus, methods, or systems to produce an oxygen-hydrogen gas mixture, such as an oxygen-rich, oxygen-hydrogen gas mixture, or a hydrogen-rich oxygen-hydrogen gas mixture. In certain embodiments, one or more than one (including for instance all) of the following embodiments of the system or apparatus may comprise each of the other embodiments or parts thereof. In certain embodiments, for example, the gas mixture may be a low temperature plasma. In certain embodiments, for example, the plasma may be a cleaner plasma than that produced by other systems and/or methods. In certain embodiments, for example, the plasma may be an oxygen rich plasma. In certain embodiments, for example, the gas mixture may be an oxygen-rich or a hydrogen-rich gas mixture. In certain embodiments, for example, the gas mixture may comprise at least one or more of the following: aqueous solution electrolysis components: monatomic oxygen, diatomic oxygen, monatomic hydrogen, diatomic hydrogen, hydrogen ions, oxygen ions, mononuclear oxygen, mononuclear, ozone, singlet oxygen, hydroxide ions, hydronium ions, superoxide, hydrogen superoxide, hydroxide radical, peroxide radical, ionic peroxide, combinations of one or more of these and/or mixtures of the same. In certain embodiments, for example, the gas mixture may be a gas mixture comprising at least hydrogen ions and oxygen ions, or diatomic oxygen and diatomic hydrogen, or oxygen ion and diatomic oxygen, etc. In certain embodiments, for example, the oxygen-hydrogen gas mixture may be an oxygen-rich gas mixture, an oxygen-hydrogen gas mixture, or a hydrogen-rich oxygen-hydrogen gas mixture. In certain embodiments, for example, the gas mixture may comprise approximately two parts hydrogen to one part oxygen (for example a ratio of hydrogen to oxygen of 2:1) or less than 2:1 (for example a ratio of hydrogen to oxygen of less than 1.75:1, less than 1.5:1, less than 1.25:1, less than 1:1, less than 0.75:1, or a ratio of hydrogen to oxygen of less than 0.5:1, etc.). In certain embodiments, for example, the gas mixture produced may be modified before being delivered to the internal combustion engine. In certain embodiments, for example, the gas mixture may be combined with an additive and/or the composition of the gas mixture may be modified by adding or removing portions of the gas mixture. In certain embodiments, for example, an electrolysis process may generate a gas mixture having a hydrogen to oxygen ratio in the range of between 1.8:1 to 2.3:1, for example a hydrogen to oxygen ratio of 2:1, and an apparatus, system, or method may be capable of delivering a gas mixture having a hydrogen to oxygen ratio of less than 2:1, for example a ratio of 1.8:1 or less, 1.7:1 or less, 1.5:1 or less, 1.3:1 or less, by removing, or recycling, a portion of the hydrogen from the gas mixture prior to delivery. Alternatively, in certain embodiments, for example, the apparatus, system, or method may be capable of generating a 2:1 ratio of hydrogen to oxygen but some of the hydrogen or oxygen, for example oxygen, may be trapped in bubbles, and the apparatus, system, or method may be configured to enable the release of the trapped oxygen to effectively deliver more oxygen to the internal combustion engine. In certain embodiments, for example, the apparatus, system, or method may comprise methods capable of producing a gas mixture that is approximately two parts oxygen to one part hydrogen (for example 2:1) or less than 2:1 (for example 1.75:1, 1.5:1, 1.25:1, 1:1, etc.). In certain embodiments, for example, an electrolysis process may generate between an oxygen to hydrogen ratio in the range of between 1.8:1 to 2.3:1, for example a 2:1 ratio of oxygen to hydrogen and the apparatus, system, or method may be capable of delivering a gas mixture having an oxygen to hydrogen ratio of less than 2:1, for example an oxygen to hydrogen ratio of 1.8:1 or less, 1.7:1 or less, 1.5:1 or less, 1.3:1 or less. In certain embodiments, for example, the apparatus, system, or method may be capable of delivering a gas mixture having an oxygen to hydrogen ratio of less than 3.5:1, less than 3:1, less than 2.75:1, less than 2.5:1 oxygen to hydrogen.

Certain embodiments may provide, for example, apparatus, methods, or systems to more reliably controlled gas mixture generation process. In certain embodiments, for example, the current provided for gas generation may be continually or continuously regulated or controlled, for example, in real time (or substantially real time), so a predetermined quantity of gas is consistently produced.

Certain embodiments may provide, for example, apparatus, methods, or systems to utilize a substantially closed-loop method of electrolysis that recycles a water-reagent (or water-electrolyte or aqueous solution electrolysis component) mixture in an effort to reduce its consumption.

Certain embodiments may provide, for example, apparatus, methods, or systems capable of altering combustion (for example diesel combustion) chemistry to reduce particulate formation. In certain embodiments, for example, the methods may be capable of achieving a reduction in particulate formation from an internal combustion engine of greater than 5%, for example greater than 10%, greater than 15%, greater than 20%, greater than 25%, greater than 30%, greater than 35%, greater than 40%, greater than 50%, greater than 60%, greater than 75%, greater than 80%, greater than 90%, greater than 95% or close to 100%. In certain embodiments, for example, the concentration of an oxidizer in an internal combustion engine may be increased. In certain embodiments, for example, the increase in the amount of oxidizers may be at least 5%, for example at least 10%, at least 15%, at least 20%, at least 25%, at least 30%, at least 35%, at least 40%, at least 45%, or at least 50%. In certain embodiments, for example, the increase in the amount of oxidizers may be in the range of between 5-50%, such as between 5-25%, between 10-20%, between 10-40%, between 15-25%, between 20-30%, between 25-35%, between 25-50%, between 30-40%, between 40-50%, between 35-45%, or between 40-50%.

Certain embodiments may provide, for example, apparatus, methods, or systems to distribute the oxidizer for more even air/fuel mixture.

Certain embodiments may provide, for example, apparatus, methods, or systems to generate a gas mixture that is an accelerant to speed combustion and/or increase combustion completion.

Certain embodiments may provide, for example, apparatus, methods, or systems to displace air with oxygen and/or hydrogen within the engine's intake system.

Certain embodiments may provide, for example, apparatus, methods, or systems to create a shorter combustion process that lowers the engine temperature thereby reducing the formation of nitrogen oxides.

Certain embodiments may provide, for example, apparatus, methods, or systems to generate an optimized or partially optimized quantity of a gas mixture, such as a gas mixture having one or more aqueous solution electrolysis components, into the engine's intake for improved combustion. In certain embodiments, for example, the apparatus, methods, or systems may be capable of producing in the range of between 1-7.5 liters of gas per minute, such as 1.2, 1.7, 2.0, 2.9, 3.5, 5.0, or 7.0 liters of gas per minute, and/or produce in the range of between 0.08-0.75 liters of gas per minute per liter of engine displacement, such as 0.1, 0.12, 0.17, 0.20, 0.25, 0.29, 0.3, 0.32, 0.35, 0.4, 0.45, 0.50, 0.6, or 0.70 liters of gas per minute per liter of engine displacement. In certain embodiments, for example, the apparatus, methods, or systems may be capable of producing in the range of between 0.25-3 liters of gas per minute, such as between 0.25-2.5, between 0.25-2, between 0.25-1.5, between 0.25-1, between 0.25-0.50, between 0.50-0.75, between 0.5-2.5, between 0.5-1.5, between 0.75-1, between 1-2, between 1-3, between 1-1.5, between 1.25-1.75, between 1.5-2, between 2-2.5, or between 2.5-3 liters of gas per minute.

Certain embodiments may provide, for example, apparatus, methods, or systems to reduce the particulate emissions of an internal combustion engine. In certain embodiments, for example, a method may comprise the steps of generating a gas mixture for use within the internal combustion engine and providing the gas mixture to the internal combustion engine during operation of the internal combustion engine. In certain embodiments, for example, a method may comprise: generating a gas mixture for use within the internal combustion engine, and providing the gas mixture to the internal combustion engine during operation of the internal combustion engine. In certain embodiments, for example, the gas mixture may be generated in substantially real time relative to the consumption of the gas mixture. In certain embodiments, for example, the gas mixture may be generated onboard the vehicle during operation of the internal combustion engine.

Certain embodiments may provide, for example, apparatus, methods, or systems wherein a tank may be at least partially filled with an aqueous solution consisting essentially of water and a predetermined quantity of electrolyte (reagent). In certain embodiments, for example, the apparatus, methods, or systems may perform electrolysis of the aqueous solution within a cell (i.e., an electrolytic cell) configured for aiding in the electrolysis of the aqueous solution.

EXAMPLES

Example 1

A series of electrolysis cells were studied with different plates. In one cell, uncoated stainless steel plates were used and in a second cell platinum-coated stainless steel plates were used. The electrolyte concentration, of potassium carbonate in water, was adjusted in the cell with uncoated plates such that the current draw was essentially identical. All other conditions were essentially identical. The following table reports the results.

TABLE 1

| Performance Feature | Uncoated versus Coated Plates |
| --- | --- |
| Electrolyte Concentration | Uncoated plates required approximately 3 times greater concentration. |
| HHO Gas Production | Uncoated plates produced approximately 50% less HHO gas. |
| Current Draw | After 4 hours of testing, the cells with uncoated plates had a noticeably lower electrolyte level resulting in lower current draw. |

Experimental Note: Iridium-coated plates performed similar to platinum coated plates Example 2

A series of electrolysis cells were studied with different plates. In a first cell, 7 platinum coated stainless steel plates were used and in a second cell 5 platinum coated stainless steel plates were used. The current draw was kept essentially the same for both cells during the test procedure, by adjusting the concentration of the electrolyte in the 7-plate cell to almost twice the concentration of the 5-plate cell. All other conditions were essentially identical. The following table reports the results.

TABLE 2

| Performance Feature | 5 Plates Versus 7 Plates |
|---|---|
| HHO Gas Production | 5 plates produced 20-25% more HHO gas. |

All publications and patent applications mentioned in this specification are herein incorporated by reference to the same extent as if each individual publication or patent application was specifically and individually indicated to be incorporated by reference.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "both or either or in a series having more than two elements all or a subset of all elements or just one of the elements" Thus, as a non-limiting example, a reference to "A, B and/or C," is understood to include A, B and C, A and B, A and C, B and C, and A or B or C. As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The features disclosed in this specification (including accompanying claims, abstract, and drawings) may be replaced by alternative features serving the same, equivalent or similar purpose, unless expressly stated otherwise. Thus, unless expressly stated otherwise, each feature disclosed is one example of a generic series of equivalent or similar features.

The subject headings used in the detailed description are included for the ease of reference of the reader and should not be used to limit the subject matter found throughout the disclosure or the claims. The subject headings should not be used in construing the scope of the claims or the claim limitations.

The disclosure has been described with reference to particular embodiments. However, it will be readily apparent to those skilled in the art that it is possible to embody the disclosure in specific forms other than those of the embodiments described above. The embodiments are merely illustrative and should not be considered restrictive. The scope of the disclosure is given by the appended claims, rather than the preceding description, and all variations and equivalents that fall within the range of the claims are intended to be embraced therein.

What is claimed is:

1. An HHO gas second fuel system for an internal combustion engine, comprising:
   i) a pressure-resistant container comprising: an electrolysis cell configured to generate an HHO gas second fuel from an electrolyte solution contained therein; and
   ii) a multi-point gas distribution system comprising: a controller and a plurality of control valves, wherein the multi-point gas distribution system is configured to distribute 0.08-0.75 liters of the generated HHO gas second fuel per minute per liter of engine displacement via the plurality of control valves at multiple locations about the internal combustion engine,
wherein the pressure-resistant container further comprises: (a) a first defined space for the electrolyte solution and a plurality of electrolysis plates; and (b) a second defined space, between the first defined space and the multi-point distribution system, for a volume of the HHO gas second fuel, wherein the volume of the second defined space is at least 35% of the volume of the first defined space up to equal the volume of the first defined space and there is at least one opening between the first defined space and the second defined space that enables both electrolyte and HHO gas to pass.

2. The system of claim 1, further comprising: a multi-point gas distribution control system that controls an amount and timing of the delivery of the HHO gas second fuel via the plurality of control valves.

3. The system of claim 1, wherein at least one control valve of the plurality of control valves has an outlet proximate a combustion chamber inlet of the internal combustion engine.

4. The system of claim 3, wherein the combustion chamber inlet is an air intake orifice.

5. The system of claim 3, wherein the outlet is within 3 inches of the combustion chamber inlet.

6. The system of claim 5, wherein the outlet is defined by a lance, the lance connected to one of the plurality of control valves.

7. The system of claim 1, wherein the pressure-resistant container is adapted for use onboard a vehicle.

8. The system of claim 1, wherein the pressure-resistant container is adapted for use with a generator set engine.

9. The system of claim 1, wherein the HHO gas second fuel system further comprises a retrofitted internal combustion engine integrated with the outlet.

10. A method for delivering an HHO gas second fuel to an internal combustion engine, comprising:
   i) generating an HHO gas second fuel in a pressure-resistant container via electrolysis of an electrolyte solution; and
   ii) distributing 0.08-0.75 liters of the generated HHO gas second fuel per minute per liter of engine displacement at multiple locations about the internal combustion engine,
wherein the pressure-resistant container further comprises: (a) a first defined space for the electrolyte solution and a plurality of electrolysis plates; and (b) a second defined space, positioned between the first defined space and the multi-point distribution system, for a volume of the HHO gas second fuel, wherein the volume of the second defined space is at least 35% of the volume of the first defined space up to equal the volume of the first defined space there is at least one opening between the first defined space and the second defined space that enables both electrolyte and HHO gas to pass.

11. The method of claim 10, wherein the generated HHO gas second fuel is air-free prior to the distributing.

12. The method of claim 10, further comprising controlling timing and duration of the generating to maintain a pressure in the pressure-resistant container in the range of 45-50 psi.

13. The method of claim 10, wherein at least one of the multiple locations is within 3 inches of a combustion chamber inlet of the internal combustion engine.

14. The method of claim 10, wherein the temperature of the HHO gas second fuel is controlled prior to the distributing by exchanging heat between the HHO gas second fuel and an engine coolant.

15. The method of claim 10, wherein the method increases fuel economy of the internal combustion engine by at least 10%.

16. The method of claim 10, wherein the method reduces one or more engine-out emissions by at least 25%.

17. The method of claim 15, wherein the method reduces one or more engine-out emissions by at least 25%.

18. The method of claim 10, wherein the HHO gas second fuel comprises a mixture of 2:1 hydrogen to oxygen.

19. The method of claim 10, wherein the timing, duration or timing and duration of the generating is controlled in response to a change in engine demand.

20. The method of claim 10, comprising distributing the second fuel at a pressure in the range of 5-25 psi higher than an air pressure downstream of a turbo charger, the turbo charger in communication with the internal combustion engine.

21. The method of claim 10, wherein the internal combustion engine is a gasoline engine.

22. The method of claim 10, wherein the internal combustion engine is a diesel engine.

* * * * *